United States Patent
Cook

(10) Patent No.: US 10,158,177 B2
(45) Date of Patent: Dec. 18, 2018

(54) ANTENNA HORN WITH SUSPENDED DIELECTRIC TUNING VANE

(71) Applicant: Scott Cook, Marietta, GA (US)

(72) Inventor: Scott Cook, Marietta, GA (US)

(*) Notice: Subject to any disclaimer, the term of this patent is extended or adjusted under 35 U.S.C. 154(b) by 162 days.

(21) Appl. No.: 15/457,972

(22) Filed: Mar. 13, 2017

(65) Prior Publication Data
US 2018/0233828 A1 Aug. 16, 2018

Related U.S. Application Data

(60) Provisional application No. 62/307,128, filed on Mar. 11, 2016.

(51) Int. Cl.

| | | |
|---|---|---|
| *H01Q 13/02* | (2006.01) | |
| *H01P 1/17* | (2006.01) | |
| *H01Q 25/00* | (2006.01) | |
| *H01Q 3/12* | (2006.01) | |
| *H01Q 15/23* | (2006.01) | |
| *H01Q 19/13* | (2006.01) | |
| *H04H 40/90* | (2008.01) | |
| *H04N 7/20* | (2006.01) | |
| *H04N 21/61* | (2011.01) | |

(52) U.S. Cl.
CPC ......... *H01Q 13/0258* (2013.01); *H01P 1/172* (2013.01); *H01Q 3/12* (2013.01); *H01Q 13/0241* (2013.01); *H01Q 15/23* (2013.01); *H01Q 19/13* (2013.01); *H01Q 25/007* (2013.01); *H04H 40/90* (2013.01); *H04N 7/20* (2013.01); *H04N 21/6143* (2013.01)

(58) Field of Classification Search
CPC ...... H01Q 13/0258; H01Q 1/172; H01Q 1/17; H01Q 15/244
See application file for complete search history.

(56) References Cited

U.S. PATENT DOCUMENTS

| 3,071,768 A | 1/1963 | Dunbar |
| 3,653,055 A | 3/1972 | Wu et al. |
| (Continued) | | |

FOREIGN PATENT DOCUMENTS

GB 848531 9/1960

OTHER PUBLICATIONS

PCT/US2017/022205 Feb. 6, 2017 Patent Cooperation Treaty, International Search Report and Written Opinion.

*Primary Examiner* — Graham Smith
(74) *Attorney, Agent, or Firm* — Michael J. Mehrman; Mehrman Law Office

(57) ABSTRACT

A digital video broadcast satellite (DVB-S) television antenna horn assembly, reflector antenna, and a satellite communication system in which the antenna horn includes a suspended dielectric tuning vane that reduces the horn size, modifies the shape the reception pattern, and improves the antenna performance in a number of ways. The antenna horn and the dielectric tuning vane are configured to impart a combined differential phase shift protocol, such as CP polarization, on a circular polarity (CP) signal as the CP signal propagates through the horn from a reception aperture to an output aperture. The dielectric tuning vane may be built into the antenna horn, snap into the antenna horn, be built into a protective plastic lens cover that fits over horn opening, or designed to snap into the plastic lens cover. Various dielectric tuning vanes are suitable for single horn structures and multi-horn structures built into LNB amplifiers.

20 Claims, 18 Drawing Sheets

(56) References Cited

U.S. PATENT DOCUMENTS

| | | | |
|---|---|---|---|
| 4,797,681 | A | 1/1989 | Kaplan et al. |
| 6,323,819 | B1 | 11/2001 | Ergene |
| 2005/0116871 | A1 | 6/2005 | Moheb et al. |
| 2007/0296641 | A1 | 12/2007 | Cook |
| 2011/0181479 | A1 | 7/2011 | Martin et al. |

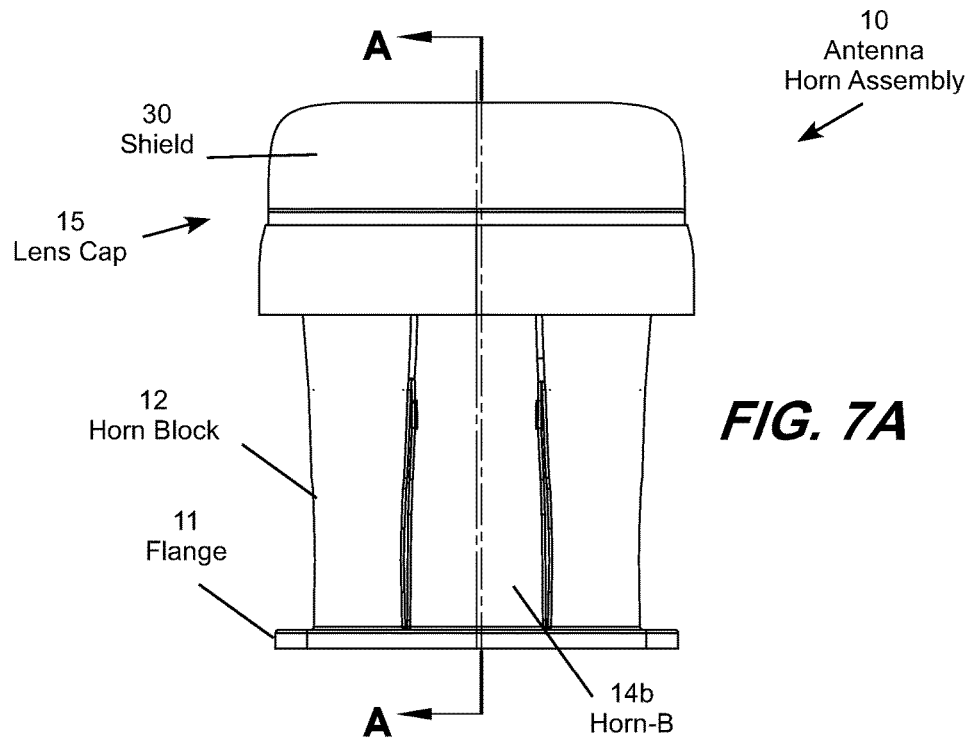
*FIG. 7A*
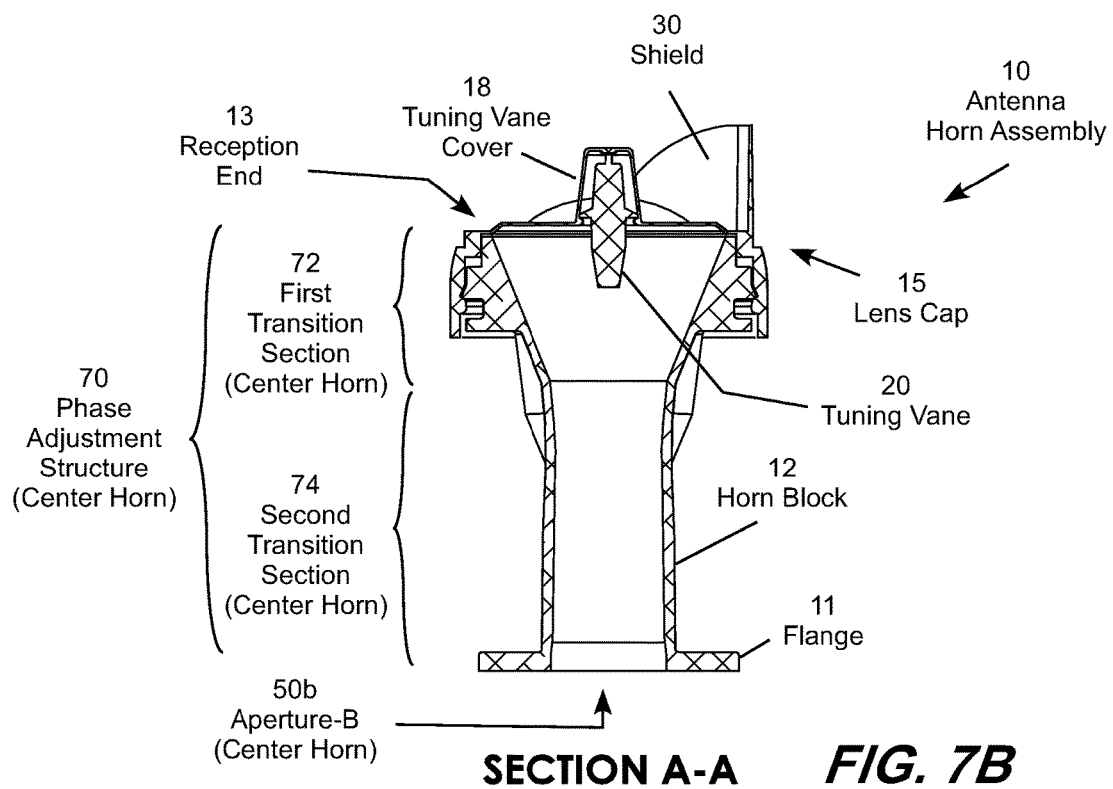
SECTION A-A  *FIG. 7B*

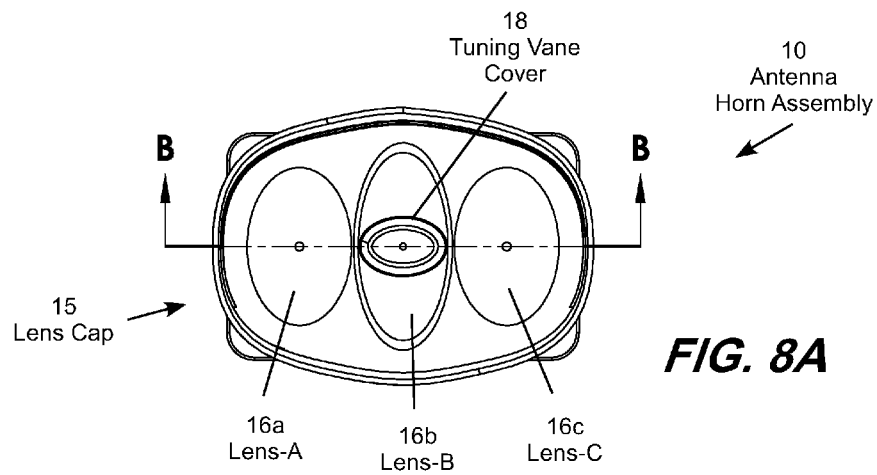
FIG. 8A
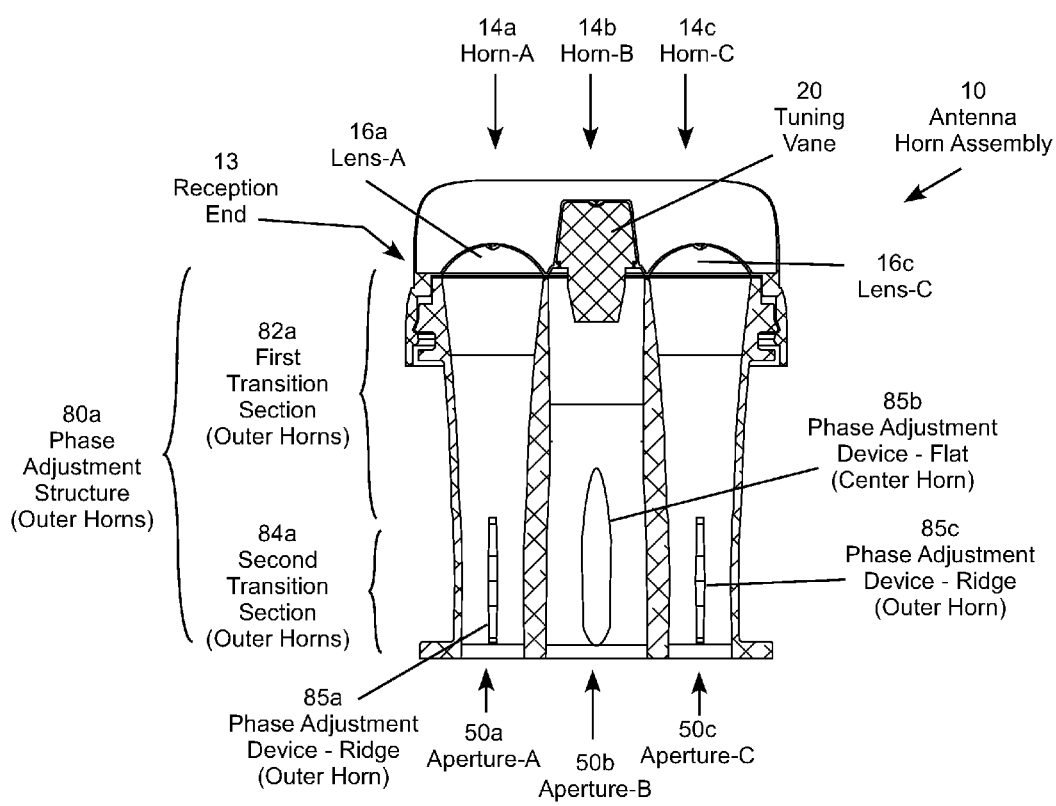
SECTION B-B  FIG. 8B

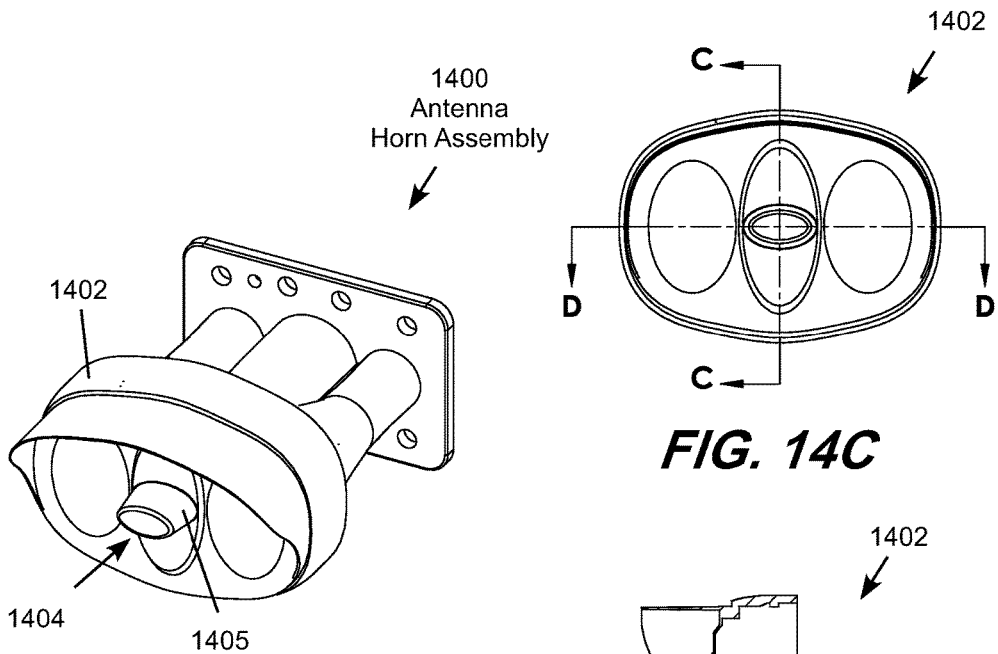
FIG. 14A
FIG. 14C
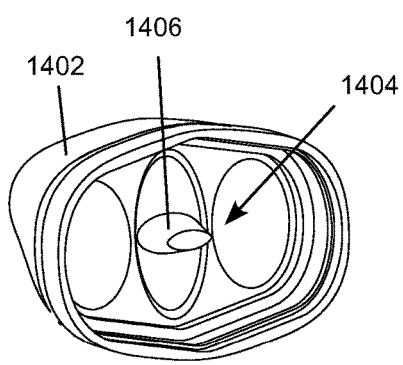
FIG. 14B
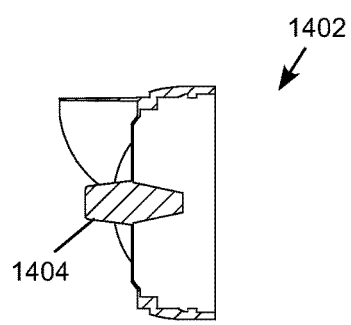
SECTION C-C
FIG. 14D
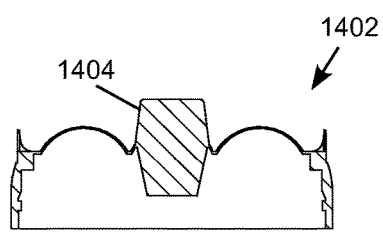
SECTION D-D
FIG. 14E

SECTION D-D

SECTION C-C

SECTION A-A

SECTION B-B

SECTION A-A

SECTION B-B

ANTENNA HORN WITH SUSPENDED DIELECTRIC TUNING VANE

RELATED APPLICATION

This application claims priority to U.S. Provisional Application Ser. No. 62/307,128 entitled "Antenna Horn with Dielectric Tuning Vane" filed Mar. 11, 2016, which is incorporated herein by reference.

TECHNICAL FIELD

The present invention is directed to antenna systems and, more particularly, to a digital video broadcast satellite (DVB-S) television antenna having one or more antenna horns with a suspended dielectric tuning vane that reduces the size and improves the performance of the antenna horn.

BACKGROUND

Digital video broadcast satellite (DVB-S) antennas are deigned to communicate with one or more satellites to simultaneously receive and broadcast a large number of television channels and related information. An antenna horn cooperates with a reflector to focus its reception pattern on the location of a desired satellite for efficient utilization of the energy beam. Generally, larger antenna horns can focus the reception pattern more narrowly, while smaller horns requiring less material are less expensive to manufacture. Allowing the antenna horn to focus its reception pattern more narrowly also reduces the size of the reflector, which further reduces the size and cost of the antenna.

In some cases, multiple antenna horns are built into a single housing referred to as a low noise block (LNB) amplifier, which focus their reception patterns on a common reflector. Utilizing a single reflector for multiple antenna horns provides efficiency while limiting the size of the horns that can be physically accommodated. Multi-horn blocks are well suited to reflector systems designed to communicate with closely spaced satellites where the adjacent horns need to be positioned very close together. Placing multiple antennas very close together presents design challenges, such as unwanted signal coupling or interference between the closely spaced adjacent horns. This interference degrades performance, creating the need for improved directivity and narrowing of the antenna reception pattern in order to improve isolation between the adjacent horns. A need therefore exists for design techniques for reducing the size and improving the performance of antenna horns.

SUMMARY OF THE INVENTION

The invention solves the problems described above through an antenna horn assembly, a reflector antenna, and a satellite communication system in which the antenna horn includes a suspended dielectric tuning vane that reduces the horn size, modifies the shape the reception pattern, and improves the performance of the antenna horn in a number of ways. The antenna horn and the dielectric tuning vane are configured to impart a combined differential phase shift protocol, such as converting circular polarization (CP) to linear polarization (LP), where an incident CP signal is converted to LP polarization as it propagates through the horn from a reception aperture to an output aperture. The dielectric tuning vane may be built into the antenna horn, snap into the antenna horn, be built into a protective plastic lens cover that fits over horn opening, or designed to snap into the plastic lens cover. Various dielectric tuning vanes are suitable for single-horn structures and multi-horn structures built into LNB amplifiers. The dielectric tuning vane may be employed with one or more horns of a multi-horn embodiment. For the multi-horn embodiment, in addition to providing greater CP polarization, tuning the dielectric tuning vane improves isolation between horns.

BRIEF DESCRIPTION OF THE DRAWINGS

FIG. 7A is a top view of the three-horn antenna horn assembly showing section line A-A.

FIG. 7B is a side section view of the three-horn antenna horn assembly along the section line A-A shown in FIG. 7A.

FIG. 8A is a front view of the three-horn antenna horn assembly showing section line B-B.

FIG. 8B is a top section view of the three-horn antenna horn assembly along the section line B-B shown in FIG. 8A.

FIGS. 14A-E are various views illustrating a first alternative three-horn antenna horn assembly in which the dielectric tuning vane is built into the lens cap.

DETAILED DESCRIPTION OF EXEMPLARY EMBODIMENTS

Figure 1:
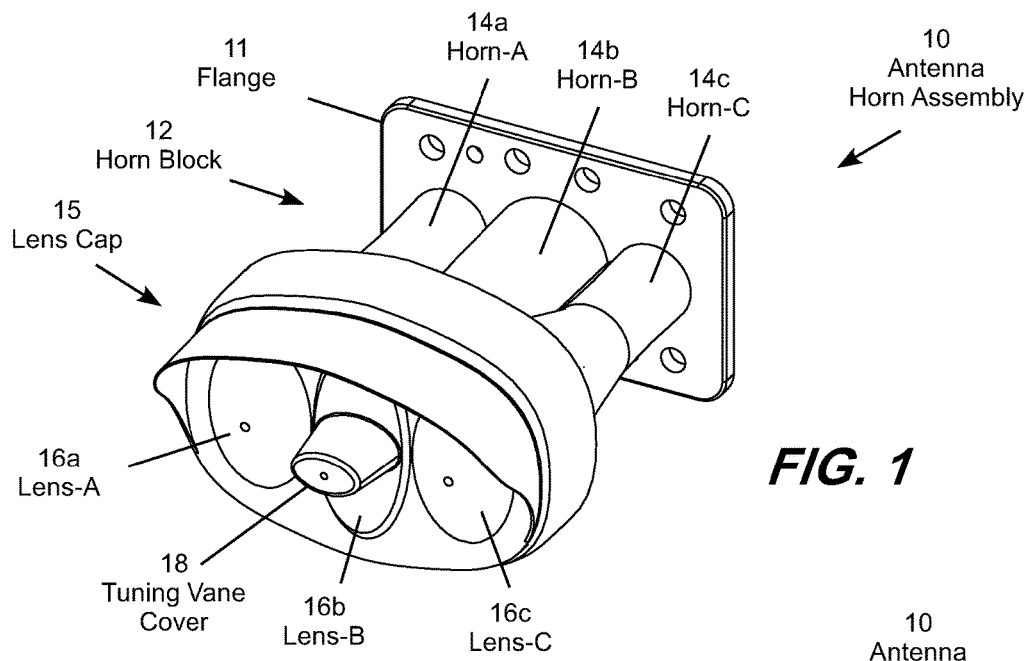
FIG. 1 is a perspective view of a three-horn antenna horn assembly with a dielectric tuning vane that snaps into a lens cap.

Illustrative embodiments of the invention are described below and shown in the appended drawings. Embodiments include a wide range of single-horn and multi-horn reflector antennas with a suspended dielectric tuning vane that reduces the horn size, improves the shape the reception pattern, and improves the performance of the antenna horn. In general, the dielectric tuning vane concentrates the reception pattern and may be configured to match the reception pattern to the shape of a particular reflector. The dielectric tuning vane may also be configured to differentially phase shift the linear components of a circular polarization (CP) signal and thereby participate in a differential phase shift protocol performed by the horn antenna, such as CP polarization. The dielectric tuning vane can vary in size and shape (e.g., axially symmetric or oblong) to achieve a desired reception pattern shape and improve performance for reflectors of various optics including various rim shapes and/or focal lengths. The dielectric tuning vane may therefore be designed to decrease unwanted coupling (improve isolation) and improve the performance and form factor of the antennas in a number of ways.

For example, the dielectric tuning vane generally improves directivity of the horn, and decreases side lobes, by concentrating and shaping the reception pattern which, in turn, improves (increases) the reflector system gain and directivity. The dielectric tuning vane also improves (decreases) the reflector system antenna noise temperature because less spillover noise energy is received into the feed directly from the warm earth or warm surrounding obstructions that exhibit high noise temperatures. The feed pattern is also better concentrated on the reflector, which reflects much lower clear sky temperatures compared to warm earth and other obstructions. In a particular embodiment, a dielectric tuning vane is positioned in the reception zone of the center antenna horn of a three-horn block utilizing a common reflector to narrow and shape the reception pattern of the center horn and improve isolation between the center horn and outer horns, all of which contribute to improving (increasing) reflector antenna gain, improving (decreasing) reflector antenna noise, and improving (decreasing) unwanted CP cross polarization levels.

In a multi-horn structure, the dielectric tuning vane can also be designed in conjunction with an oblong waveguide section (such as a reception cone) and/or other differential phase shifting structures (such as ridges, septums or flats on the interior walls of the waveguide) to improve CP cross-polarity discrimination or isolation ("CP X-pol"). An additional benefit results from a reduction in the unwanted mutual coupling into the center feed horn from the horns on either side. This allows the center feed to be physically smaller than it would be without the dielectric tuning vane. Adding an oblong dielectric tuning vane to the center feed allows a reduction in the height of the triple feed while producing a substantial improvement in CP X-pol isolation and reduction in overall length of the feed. In general, the oblong dielectric tuning vane provides another degree of freedom to further tune and improve CP X-pol isolation. See U.S. Pat. No. 7,239,285, which is incorporated herein by reference, for a description of techniques for CP conversion without using a suspended dielectric tuning vane.

The dielectric tuning vane provides an additional differential phase shift mechanism for the horn designed to work together with one or more appropriately dimensioned differential phase shift sections in the metal waveguide of the horn, as described in U.S. Pat. No. 7,239,285, to achieve a desired level of CP X-pol isolation over a wider frequency band. The phase differential between orthogonal linear components of the circularly polarized signal that is introduced by the oblong dielectric tuning vane depends upon the size, shape and length of the dielectric tuning vane. An axisymmetric dielectric typically introduces no phase differential. Making the X-section of dielectric oblong will result in a phase differential. Increasing the length of the oblong dielectric tuning vane increases the amount of phase differential that it introduces. Making the cross section of the dielectric tuning vane more oblong (i.e., increasing its aspect ratio so that it is wider in one direction that it is in the other) generally increases the amount of phase differential that it introduces, until the vane becomes very thin. If the dielectric tuning vane becomes very thin, it therefore needs to be relatively long in order to introduce substantial differential phase shift. Furthermore, the orientation of the oblong dielectric relative to the major axis of an oblong horn determines whether the phase differential introduced by the dielectric tuning vane adds to or subtracts from the phase differential introduced by the oblong waveguide horn. The suspended dielectric tuning vane thus increases design freedom that can be utilized to produce single and multi-horn antennas, with and without reflectors, to meet a range of design constraints, objectives, and differential phase shift protocols generally used to convert CP polarization to LP polarization.

The dielectric tuning vane may be built into the antenna horn, snap into to the antenna horn, be built into a protective plastic lens cover that fits over horn opening, or designed to snap into the plastic lens cover. Although the dielectric tuning vanes in the embodiments described below are built into or snap into the lens cap, they may alternatively be built into or snap into the antenna horn. For example, a set of prongs on the dielectric tuning vane may allow the dielectric tuning vane to form an interference fit with a minimal number of attachment points in the throat of the antenna horn. In addition, although the dielectric tuning vane is deployed in the center horn of the three-horn block in certain embodiments described below, a dielectric tuning vane may be utilized with any or all horns in a particular antenna configuration. The design concepts, techniques and protocols described for the illustrative embodiments apply equally to these other configurations. A wide range of design alternatives will therefore be enabled through the following teaching of the basic principles and design techniques of the suspended dielectric tuning vane in the context of the specific illustrative embodiments.

FIGS. 1-11 illustrate one particular example of a triple-horn reflector antenna system in which a snap-in dielectric tuning vane is used to improve the performance of the center feed horn. The integrated triple-horn antenna is typically placed at the focal point of a parabolic reflector in order to simultaneously receive signals from three closely spaced satellites, as described further with reference to FIG. 11. The specific example shown is drawn approximately to scale with a horn body length of 2.70 inches (6.89 cm), as shown on FIG. 3, for the specific three-horn operational frequencies described with reference to FIG. 11.

Although each antenna horn could both transmit and receive signals from its respective satellite, only the reception operation may be described to facilitate the description, for example by defining one end of the horn as the "reception end" and the other end as the "output aperture" with the understanding that the reception end and the output aperture both receive and transmit signals. Similarly, it should also be understood that each antenna horn may transmit and receive circular polarization (CP) signals with left-hand polarization (LHP), right-hand polarization (RHP), or both LHP and RHP signals simultaneously. As the LHP and RHP signals generally experience equal and opposite differential phase shifts, only one direction of the differential phase shifts may be shown and described to facilitate the description. The axial direction between the reception end and the output aperture is referred to as the "signal propagation direction" while the direction across the horns orthogonal to the signal propagation direction is referred to as the "transverse direction" to facilitate the description.

The examples shown FIGS. 1-11 pertain to a specific multi-horn configuration that includes three closely spaced elliptical feed horns integrated into a single LNB casting, which is placed at the focal point of an elliptical rim parabolic reflector to receive signals from three closely spaced satellites. This same dielectric tuning vane techniques can be used to design dielectric tuning vanes for other systems that have differently shaped feed horns and reflectors, different numbers of feed horns, feed horns positioned at different spacing including multi-feed horns where some or all of the feed horns are separate castings. The cross-section of the oblong waveguides and dielectric tuning vanes shown in the specific examples are generally smooth and elliptical in shape. However, a variety of other oblong or relatively symmetric waveguides and dielectric tuning vane shapes may be used, such as rectangle, square, diamond, hexagon, octagon, rhombus, etc. to improve beam shape and directivity. U.S. Pat. No. 7,224,320, which is incorporated herein by reference, provides further details for various waveguide shapes.

Embodiments of the invention are suitable for use in a variety of reflector systems including parabolic or non-parabolic surfaces, as well as single or dual reflector systems for example. Embodiments of the invention may also be employed in systems that both receive and/or transmit signals to and/or from satellites or other communication platforms. Embodiments of the invention may also be used in non-reflector systems to enhance horn performance. In addition, embodiments of the invention may be used in both linear polarity and/or circular polarity applications. For linear polarity, improvements in pattern shape of the horn result in antenna systems with improved gain, directivity and noise temperature.

Figure 2:
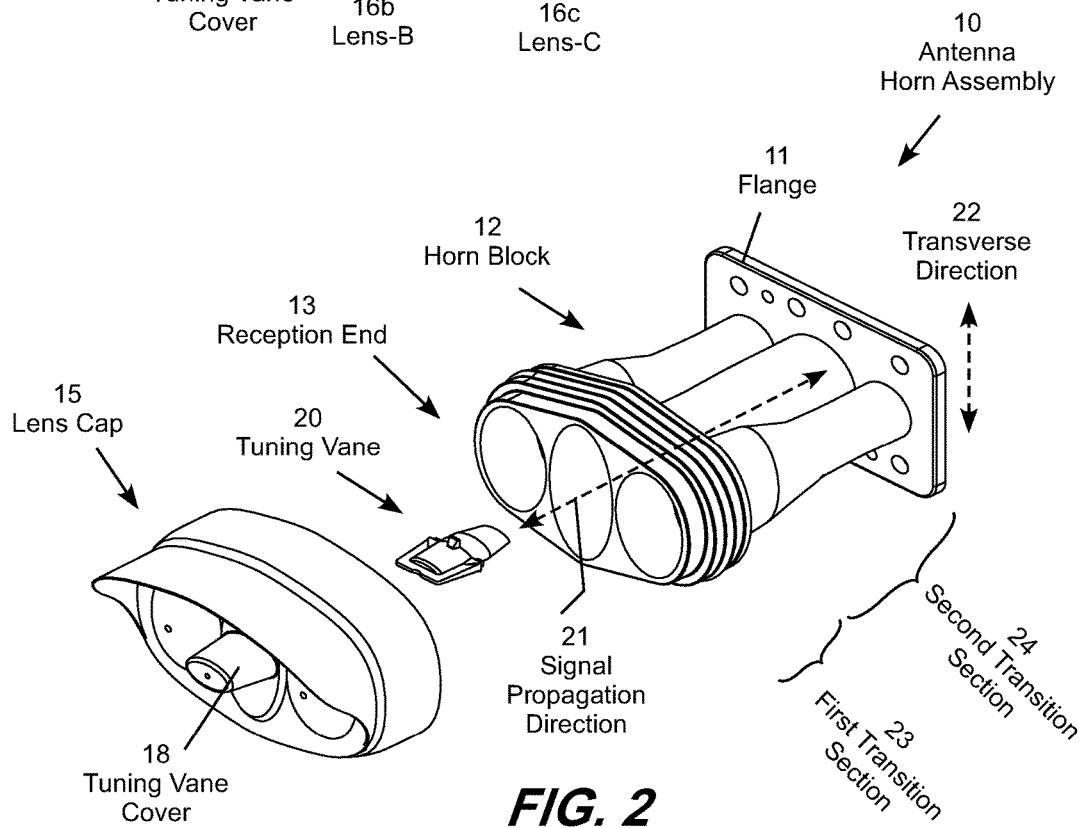
FIG. 2 is a perspective exploded view of the three-horn antenna horn assembly.

FIG. 1 is an assembled perspective view and FIG. 2 is an exploded perspective view of a three-horn antenna horn assembly 10 with a dielectric tuning vane 20 that snaps into a lens cap 15. The three-horn antenna horn assembly 10 is designed for operation with a single reflector to transmit and receive signals from three closely spaced satellites, where each horn exchanges signals with a respective satellite. This embodiment includes a lens cap 15 that supports a built-in or snap-in dielectric tuning vane to improve the performance of one or more of the antenna horns. The antenna 10 includes a flange 11 that defines the output apertures for the horns. The horn block 12 extends in the signal propagation direction 21 from the reception end 13 of the horn block to the flange 11. The reception aperture of each horn is oblong (e.g., elliptical) in the transverse direction 22. The flange 11 is used to mount the antenna horn assembly to a gooseneck or other suitable support that positions the antenna at or near the focal point of the reflector. The reflector is directed toward the closely spaced satellite and typically aligned with the major axis of the reflector aligned with the orbital path of the satellites.

The horn block 12 includes three waveguide horns 14a (first outer horn), 14b (center horn), and 14c (second outer horn). Each outer horn shares a common side wall extending in the signal propagation direction 21 with the center horn. In this particular embodiment, each horn 14a-c has an oblong (e.g., elliptical) reception aperture in the transverse direction 22. The reception aperture opens to a first transition section 23 that is oblong in the transverse direction 22 while decreasing in size along the signal propagation direction 21. The first transition section joins or fares into a second transition section 24 that is symmetric, in this example circular, in the transverse direction 22. In this particular embodiment, each horn 14a-c has an oblong reception aperture at the reception end 13, first and second transition sections 23, 24 extending in the signal propagation direction 21, terminating in a circular output aperture at the flange 11. The transition sections of each horn may also include additional differential phase structures, such as ridges, septums or flats on the interior surface of the waveguide. In this example, each horn 14a-c is designed to impart a differential phase shift protocol, which in this example includes polarizing a circular polarity ("CP") signal received at the reception end 13 by differentially phase shifting the orthogonal linear components of the CP signal by 90° to "polarize" the signal so that the linear components are aligned at the output aperture at the flange 11. The first and second transition sections 23, 24 of each horn 14a-c may have different shapes, lengths and differential phase shifting structures designed to impart different differential phase shift protocols as a matter of design choice. The use of these types of waveguide features to accomplish a variety of differential phase shift protocols is described in U.S. Pat. No. 7,239,285.

Embodiments of the present invention further improve this technology through the addition of the dielectric tuning vane 20 extending in the signal propagation direction suspended in the waveguide. The shape of the dielectric tuning vane 20 is designed to participate in lensing at the reception end of the antenna block and the differential phase shift protocol of the horn, such as CP polarization. In the particular embodiment shown in FIGS. 1-11, the dielectric tuning vane 20 suspended in the reception zone of the center horn 14b participates in the differential phase shifting (polarization) performed by the center horn. The dielectric tuning vane 20 also narrows the reception pattern of the center feed 14b to improve the X-pol isolation and improve the form factor and efficiency of the center feed.

In this particular embodiment, the lens cap 15 snaps onto the reception end 13 of the horn block 12. The lens cap 15 includes three lenses 16a-c with each lens positioned adjacent to the reception aperture of a respective horn 14a-c. A cup shaped dielectric tuning vane cover 18 is built into the center lens 16b adjacent to the reception aperture of the center horn 14b. The dielectric tuning vane 20 snaps into the dielectric tuning vane cover 18, which suspends the dielectric tuning vane in the waveguide of the center feed horn 14b. The dielectric tuning vane 20 extends through the reception aperture with an external portion of the vane positioned outside the waveguide and an internal portion of the vane inside the waveguide. Utilizing a snap-in dielectric tuning vane 20 facilitates manufacturing allowing the lens cap and the dielectric tuning vane to be molded as separate parts.

Figure 3:
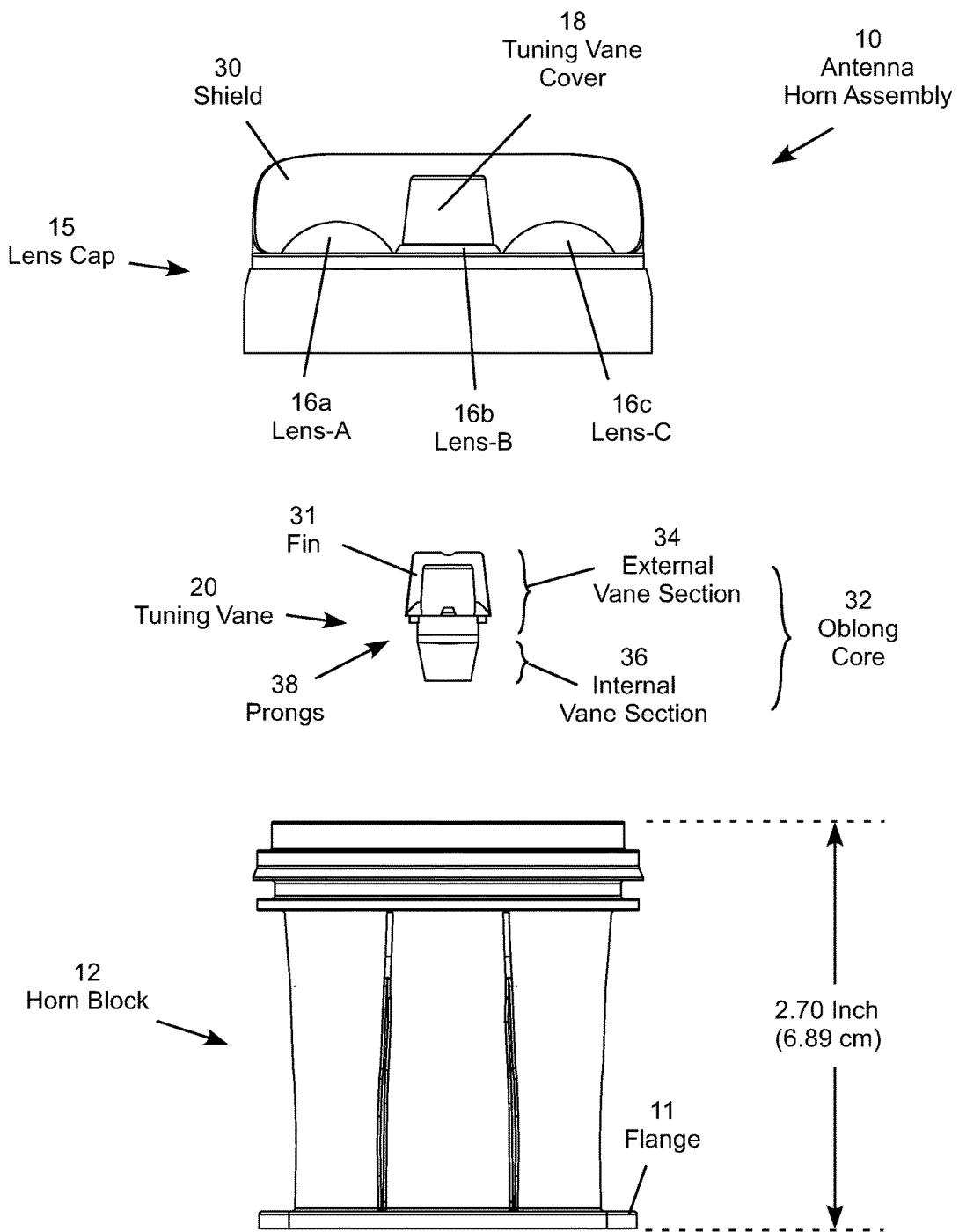
FIG. 3 is a bottom exploded view of the three-horn antenna horn assembly.

FIG. 3 is a bottom exploded view of the three-horn antenna horn assembly 10 showing the lens cap 15, the dielectric tuning vane 20 and the horn block 12 separated. The lens cap 15 includes a shield 30 to inhibit rain from wetting the lenses 16a-c. The profile view of the lens cap 15 shows the convex shape of the outer lenses 16a and 16c providing lensing for the outer horns 14a and 14c, respectively. The center lens 16b has a largely flat shape serving as a support for the dielectric tuning vane cover 18, where the dielectric tuning vane 20 provides the majority of the lensing for the center horn 14b. The dielectric tuning vane 20 includes a fin 31 around an oblong core 32 that includes an external vane section 34 that is positioned outside the reception aperture. The dielectric tuning vane 20 also includes an internal vane section 36 positioned inside the reception aperture. Four prongs 38 snap the vane 20 into the lens cover 15 with an interference fit. The use of prongs minimizes the connection surfaces between the vane 20 and the lens cover 15 to minimize signal loss and distortion that can be caused by wetting of the lens cover, for example by rain.

Figure 4:
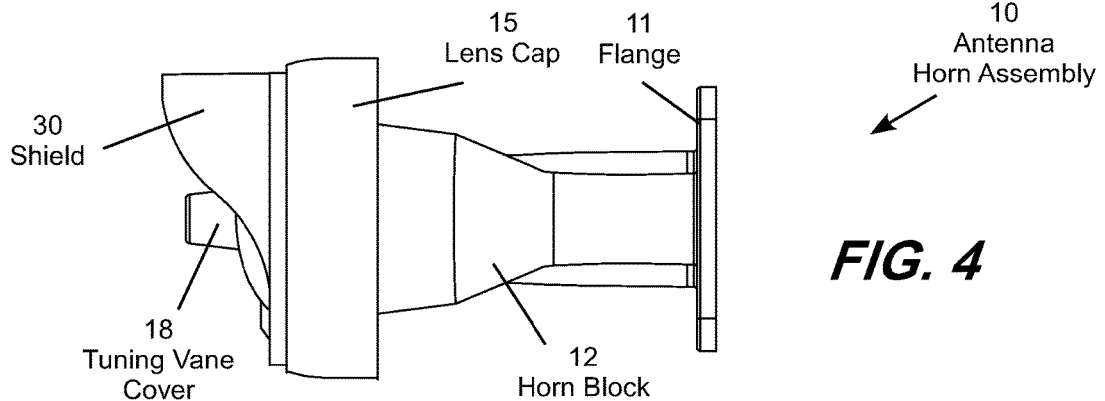
FIG. 4 is a side view of the three-horn antenna horn assembly.
Figure 5:
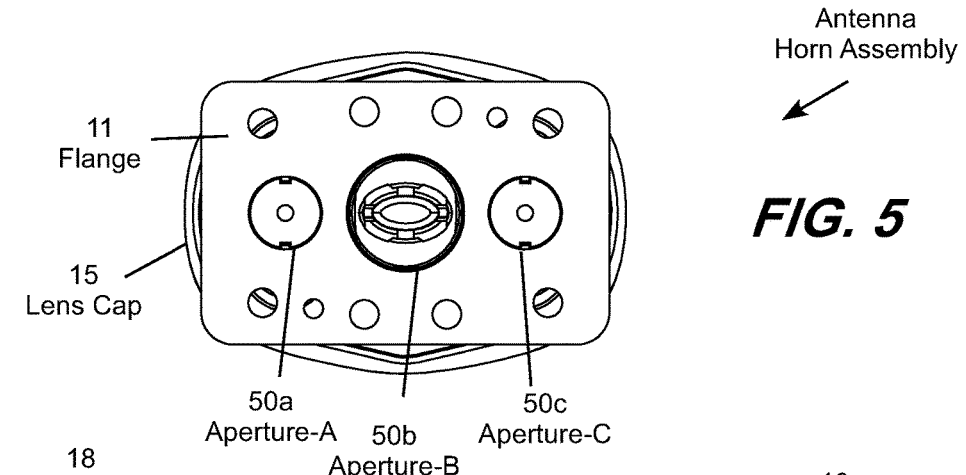
FIG. 5 is a rear view of the three-horn antenna horn assembly.
Figure 6:
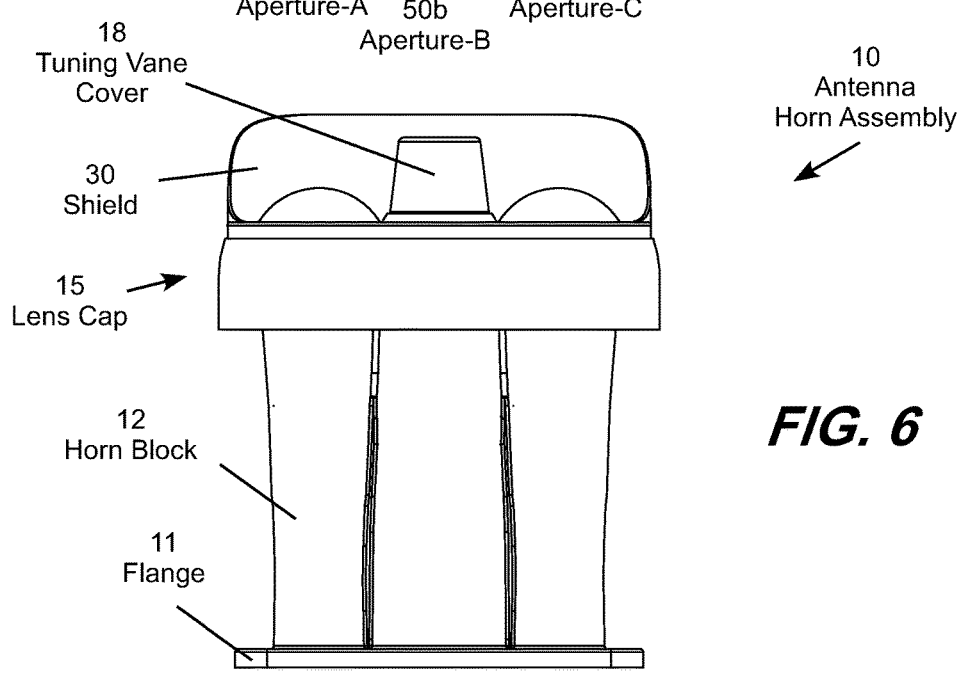
FIG. 6 is a bottom view of the three-horn antenna horn assembly.

FIG. 4 is a side view, FIG. 5 is a rear view, and FIG. 6 is a bottom view of the three-horn antenna horn assembly 10. FIG. 5 shows mounting holes and the circular output apertures 50a-c of the horns 14a-c, respectively. FIG. 7A is a top view of the three-horn antenna horn assembly 10 showing section line A-A through the center horn 14b. FIG. 7B is a side section view of the three-horn antenna horn assembly along the section line A-A showing the internal shape of the center horn. The center horn 14b forms a phase adjustment structure 70 that includes a first transition section 72 and a second transition section 74, which cooperate with the dielectric tuning vane 20 to implement a phase shift protocol that polarizes a circular polarity (CP) signal received at the reception end 13 into aligned linear components delivered to the output aperture 50b at the flange 11. The dielectric tuning vane 20 focuses the beam to fit the reflector, suppress spillover loss, and improves signal isolation by suppressing cross-horn interference into the center feed 14b.

FIG. 8A is a front view of the three-horn antenna horn assembly 10 showing section line B-B. FIG. 8B is a top section view of the three-horn antenna horn assembly along the section line B-B. The outer horn 14a (representing both outer horns 14a-c, which are identical in this embodiment) forms a phase adjustment structure 80a that includes a first transition section 82a and a second transition section 84a to polarize a circular polarity (CP) signal received at the reception end 13 into its linear components delivered to the output aperture 50a at the flange 11. The lens 16a focuses the beam to fit the reflector and suppress spillover loss. The differential phase shift protocol for the outer horn 14a is imparted by an oblong waveguide in the first transition section 82a that differentially phase shifts the CP signals propagating in the signal propagating direction. Similarly, a phase adjustment structure 85a (a pair of ridges on the interior surface of the waveguide in this embodiment) in the second transition section 84a further differentially phase shifts the CP signals propagating in the signal propagating direction. The combined differential phase imparted by the first and second transition sections 82a and 84a polarize a circular polarity (CP) signal received at the reception end 13 into its linear components delivered to the output aperture 50a at the flange 11.

Similarly, differential phase shift protocol for the center horn 14b is imparted in part by a phase adjustment structure 85b (an opposing pair of flat sections on the inner surface of the waveguide in this embodiment) in the second transition section 74 (shown in FIG. 7B) that differentially phase shifts the CP signals propagating in the signal propagating direction. The combined differential phase shift imparted by the first and second transition sections 72 and 74, together with the dielectric tuning vane 20, polarize a circular polarity (CP) signal received at the reception end 13 into its linear components delivered to the output aperture 50b at the flange 11.

Figure 9A:
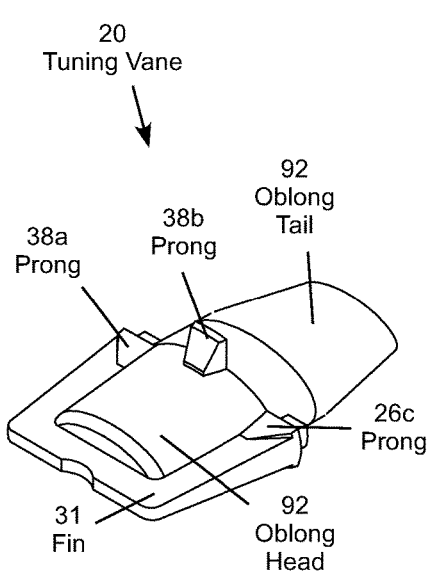
FIG. 9A is a perspective view of the dielectric tuning vane.
Figure 9B:
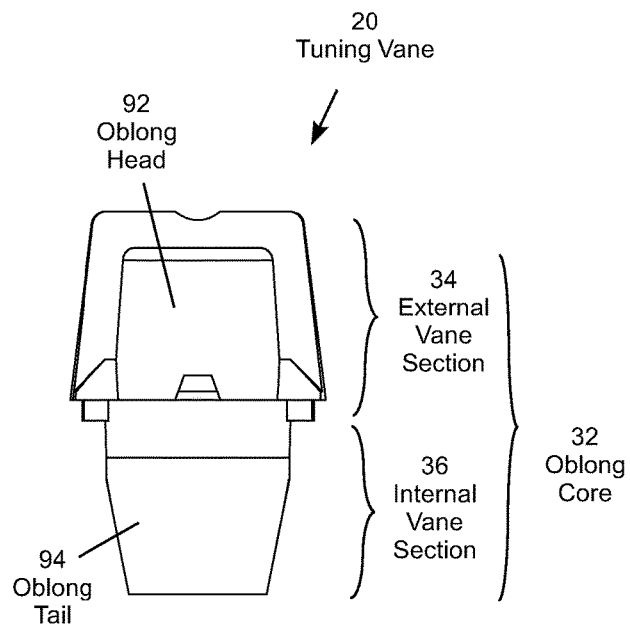
FIG. 9B is a top view of the dielectric tuning vane.
Figure 9C:
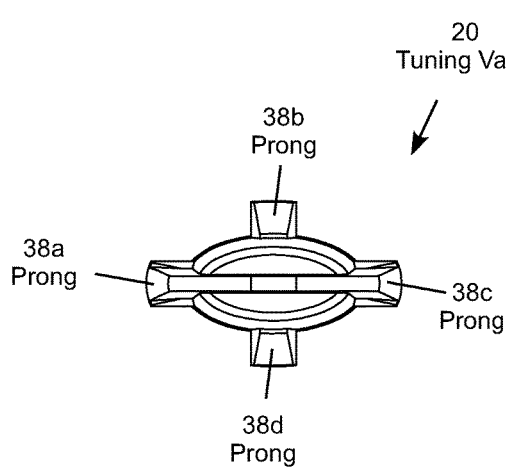
FIG. 9C is a front view of the dielectric tuning vane.
Figure 9D:
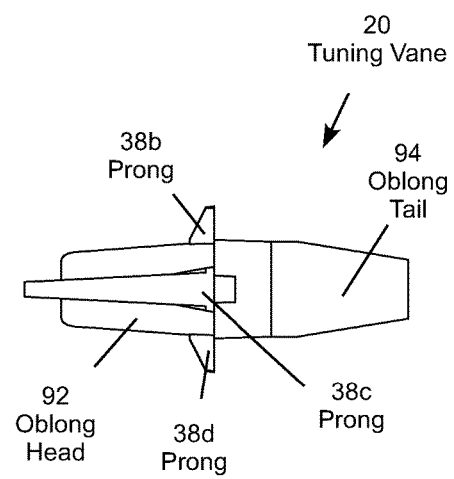
FIG. 9D is a side view of the dielectric tuning vane.

FIG. 9A is a perspective view, FIG. 9B is a top view, FIG. 9C is a front view, and FIG. 9D is a side view of the dielectric tuning vane 20. The dielectric tuning vane includes a fin 31 and an oblong core 32. The oblong shape of the core 32 differentially phase shifts the linear components of a circular polarity (CP) signal as it propagates over and past the dielectric tuning vane. The dielectric tuning vane 20 further includes an external vane section 34 and an internal vane section 36. The external vane section 34 includes the fin 31 and an oblong head 92 while the internal vane section 34 forms an oblong tail 94. The prongs 38a-d clip the dielectric tuning vane 20 into the lens cap 15 while minimizing the connection area between the lens cap and the dielectric tuning vane.

Figure 10A:
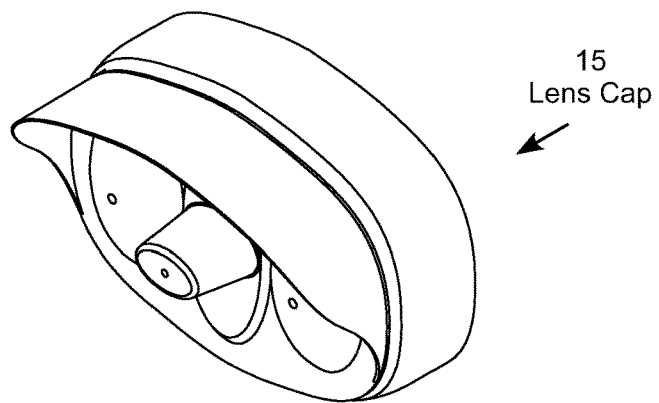
FIG. 10A is a perspective view of the lens cap.
Figure 10B:
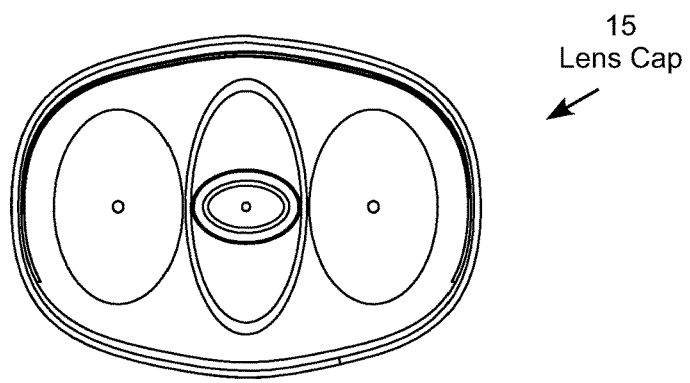
FIG. 10B is a front view of the lens cap.
Figure 10C:
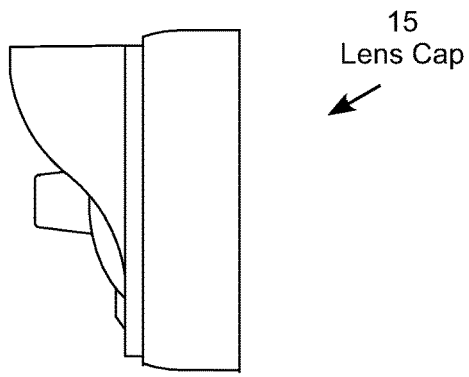
FIG. 10C is a side view of the lens cap.

FIG. 10A is a perspective view, FIG. 10B is a front view of and FIG. 10C is a side view of the lens cap 15.

Figure 11:
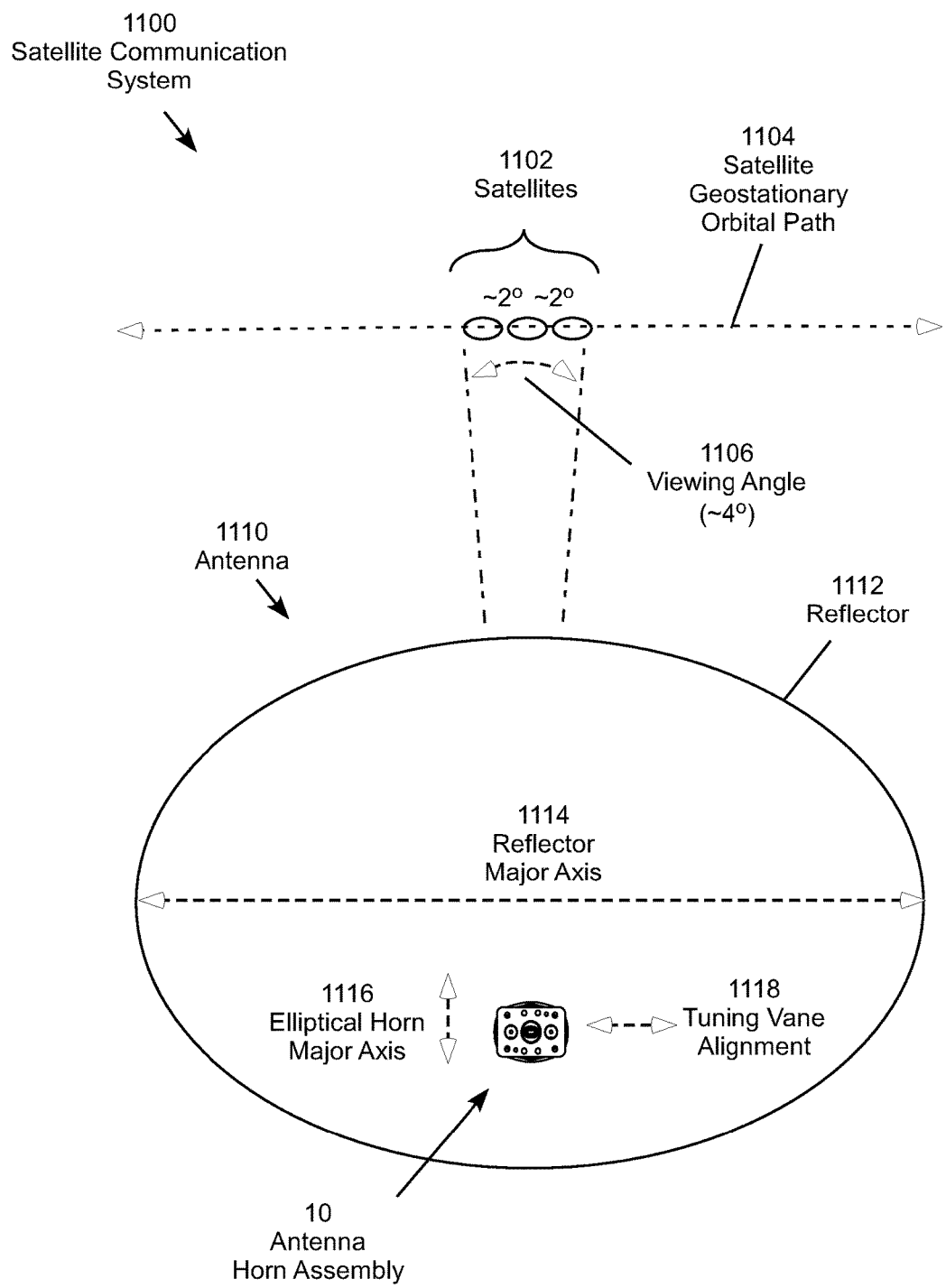
FIG. 11 is a conceptual illustration of a satellite communication system including three closely spaced satellites communicating with a reflector antenna including a three-horn antenna horn assembly in which the center horn has a suspended dielectric tuning vane.

FIG. 11 is a conceptual illustration of a satellite communication system 1100 including three closely spaced satellites 1102 communicating with a reflector antenna 1110 including a three-horn antenna horn assembly 10 in which the center horn has a suspended dielectric tuning vane. The satellites 1102 appear stationary from the antenna 1110 located on the surface of the Earth as they travel on a geostationary satellite orbital path 1104. The satellites 1102 are aligned along the geostationary satellite orbital path 1104 within a narrow viewing angle 1106 of approximately 4° between the outer satellites (~2° horn-to-horn). The antenna 1110 includes an oblong (typically, but not necessarily, elliptical) reflector 1112 having a major axis 1114. The antenna 1110 is typically installed so that its major axis 1114 is aligned with satellite orbit path 1104. The three-horn antenna horn assembly 10 is positioned approximately at the focal point of the reflector (shown slightly below center in FIG. 11 for illustrative clarity). In this configuration, the major axis of each oblong antenna horn has an alignment direction 1116 transverse to the major axis of the reflector 1112, while the dielectric tuning vane has an alignment direction 1118 parallel to the major axis 1114 of the of the reflector 1112. The dielectric tuning vane operates, in part, to narrow the beam of the center horn in the direction of the major axis 1114 on the center of the reflector 1110 to avoid picking up spillover energy from the outer horns.

For the specific example shown in FIGS. 1-11, the lens cap 15 and the dielectric tuning vane 20 are generally plastic parts selected to have desired dielectric characteristics. In this embodiment, the lens cap 15 may be a molded polypropylene part, while the dielectric tuning vane 20 may be a separately molded polystyrene part. Other materials, including additives or coatings, may be utilized to obtain parts with desired dielectric constants. As an alternative, for example, the lenses may be formed from a material selected to have a desired dielectric constant for lensing, which snap into a lens housing formed from another material selected to be durable and resistant to UV and weather degradation.

In this particular embodiment, the center feed horn 14b receives signals in the 12.2-12.7 GHz band and the 17.3-17.8 GHz band from a satellite located at 101° West longitude. The first outer feed horn 14a receives signals in the 18.3-18.8 GHZ band from a satellite located at 99° (more specifically 99.2°) West longitude, while the second outer feed horn 14c receives signals in the 19.7-20.2 GHz band from a satellite located at 103° (more specifically 10.2.8°) West longitude. Given this very close (~2°) satellite spacing, the three feed horns 14a-c utilizing a common reflector must be physically positioned very close to each other. The horns are therefore integrated into a single LNB block such that the center 101° feed horn 14b shares metal side walls with the outer 99° and 103° feed horns 14a and 14c. Without the dielectric tuning vane 20, the lower frequency band 101° center feed horn 14b would be susceptible to unwanted "spillover" coupling from the adjacent 99° and 103° feed horns 14a and 14c because the center feed horn 14b is electrically smaller (less directive) and physically very close to the two adjacent side feed horns (99° and 103°) 14a and 14c. This unwanted interference from the 99° and 103° feed horns 14a and 14c would degrade the beam shape and directivity of the center 101° feed horn 14b.

Adding the dielectric tuning vane 20 to the center feed horn 14b decreases the unwanted mutual coupling from the adjacent side feed horns 14a and 14c while improving the performance and form factor of the center feed horn in several ways. First, the dielectric tuning vane 20 improves the directivity of the 101° center feed horn 14b by concentrating and shaping its reception pattern on the reflector 1112. This improves (increases) the reflector system gain/directivity and improves (decreases) the reflector system antenna noise temperature because less spillover noise energy is received into the center feed horn 14b from the warm earth or warm surrounding obstructions at high noise temperatures. Second, the dielectric tuning vane 20 improves the concentration of the center feed horn 14b pattern on the reflector 1112, which results in lower clear sky temperatures (compared to warm earth and obstructions). Third, the dielectric tuning vane 20 is designed to improve circular polarity cross polarity discrimination ("CP X-pol"), in large part because the dielectric tuning vane reduces the unwanted mutual coupling into the center 101° feed horn 14b from the outer 99° and 103° feed horns 14a and 14c on either side. Fourth, the dielectric tuning vane 20 allows the center feed horn and the reflector to be somewhat physically smaller than they would have to be without the dielectric tuning vane. For example, adding an oblong dielectric tuning vane to the 101° center feed horn 14b allows a reduction in the height (major axis) of the center feed horn, which results in a reduction in the overall height dimension of the triple feed-horn block and the reflector 1112.

It should be noted that dielectric tuning vanes designed for various antenna horns can vary in size and shape (e.g., they may be axially symmetric or oblong, and have different lengths and cross-sectional sizes and shapes) in order to achieve a desired pattern shape and improve performance with reflectors of various optics (e.g., various rim shapes and/or focal lengths). In various configurations, adding an oblong dielectric tuning vane results in both substantial CP X-pol improvement and reduction in overall length of the feed horn. In addition, the oblong shape of the dielectric tuning vane provides another degree of freedom to further tune and improve CP X-pol. See U.S. Pat. No. 7,239,285 for a discussion of how CP conversion is achieved in elliptical horn antennas and techniques for using multiple phase differential mechanisms to improve CP X-pol performance over bandwidth.

The specific embodiment shown in FIGS. 1-11 includes four phase differential mechanism: an oblong (e.g., elliptical) horn section, a circular waveguide with flats, a circular waveguide with ridges, and an oblong dielectric tuning vane that is positioned partially inside and partially outside (in front of) the center horn in the region transitioning to free space. The snap-in dielectric tuning vane 20 has prongs 38 connecting the vane to the thin outer plastic, weather sealing lens cap 15 to minimize the contact surface with the lens cap. This reduces the susceptibility of the dielectric tuning vane 20 to wetting loss degradation when the lens cap becomes wet. Other approaches may employ thick dielectric areas that are directly exposed to the elements, but they may suffer greater losses and signal distortion when they get wet, for example from rain. The dielectric tuning vane 20 may include ribs or other stiffening structures to help to stabilize the vane and secure the position of the vane with respect to its associated feed horn, while still maintaining substantial air spaces between the snap in dielectric and the lens. Note that the contact portions and shape features of the dielectric tuning vane may change considerably in size, shape, position and number. Maintaining significant air spaces between the dielectric tuning vane and the lens is advantageous to minimize tuning impacts on the vane from the lens, which tends to vary significantly based on the condition (e.g., wet or dry) of the lens.

Figure 12A:
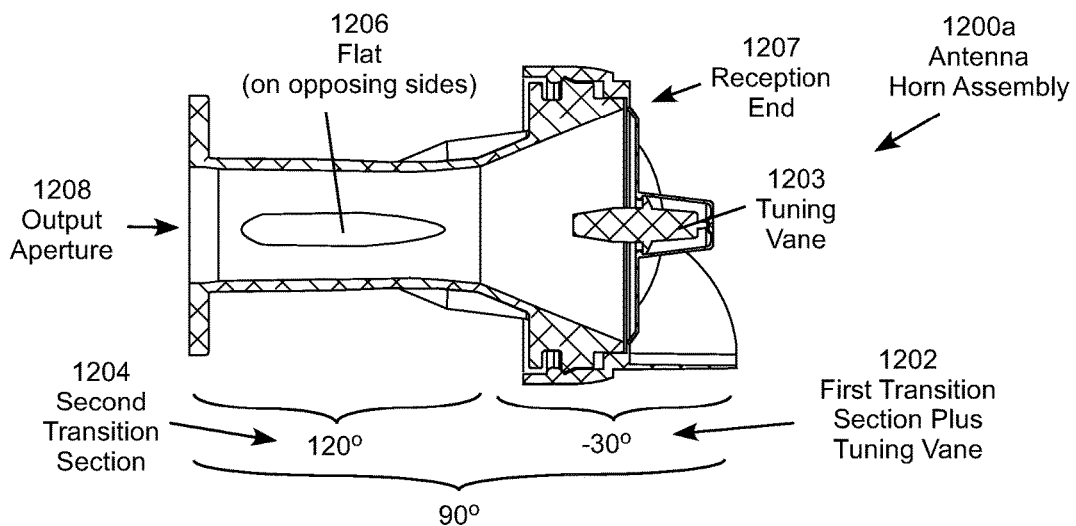
FIG. 12A is a section view of a first alternative embodiment of a single-horn antenna horn assembly with a suspended dielectric tuning vane with a flat type phase adjustment device.

FIGS. 12A-D show embodiments illustrating concepts and techniques for imparting various differential phase shift protocols in antenna horn assemblies using suspended dielectric tuning vanes. FIG. 12A shows a first alternative embodiment of an antenna horn assembly 1200a designed to impart a first differential phase shift protocol, which includes a first transition section 1202 in which an oblong waveguide together with a suspended dielectric tuning vane 1203 imparts a first differential phase shift to the linear components of a CP signal propagating through the horn. The first transition section 1202 fares into a second transition section 1204 in which a differential phase shift device 1206 imparts a second differential phase shift to the linear components of the CP signal propagating through the horn. In this example, the differential phase shift device 1206 is an opposing pair of flat sections on the inner surface of the waveguide in the second transition section 1204. The first transition section 1202 together with the dielectric tuning vane 1203 imparts a differential phase shift of −30° on the linear components of the signal and the second transition section 1204 imparts a differential phase shift of 120° for a net differential phase shift of 90° as a CP signal received at the reception end 1207 propagates to the output aperture 1208. The net 90° differential phase shift polarizes the CP signal by differentially phase shifting the orthogonal linear components of the CP signal received at the reception end 1207, so that the linear components are aligned by the time they reach the output aperture 1208 of the horn. This example demonstrates a subtractive differential phase shift protocol in which the direction of the differential phase shift imparted by the first transition section 1202 (e.g., counter-clockwise indicated by a negative sign) is opposite to the direction of the differential phase shift imparted by the second transition section 1204 (e.g., clockwise indicated by a positive sign). The subtractive differential phase shift of the transition sections has the beneficial effect of flattening the gain (response curve) of the horn across the operational bandwidth, as described in U.S. Pat. No. 7,239,285.

Figure 12B:
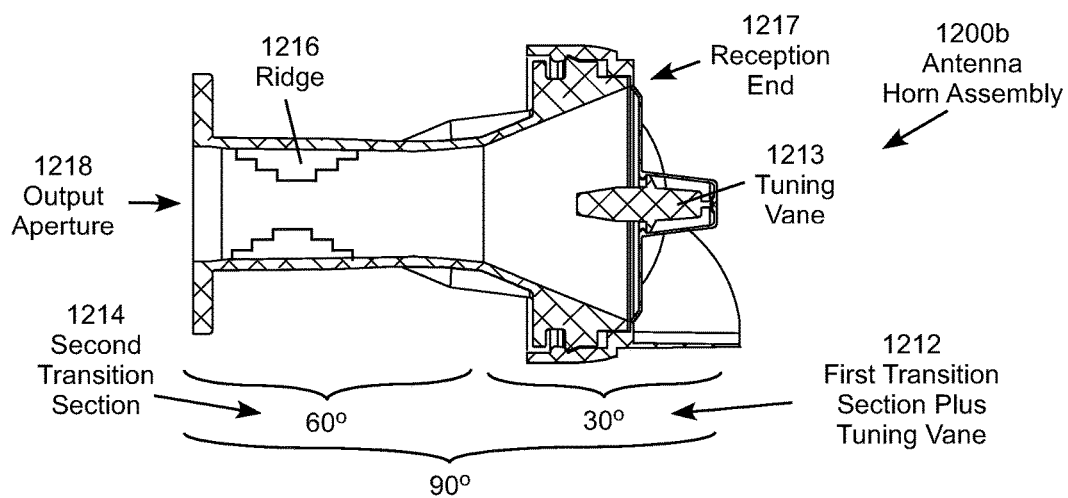
FIG. 12B is a section view of a second alternative embodiment of a single-horn antenna horn assembly with a suspended dielectric tuning vane with a ridge type phase adjustment device.

FIG. 12B shows a second alternative embodiment of a horn antenna horn assembly 1200b designed to impart a second differential phase shift protocol, which includes a first transition section 1212 in which an oblong waveguide together with a suspended dielectric tuning vane 1213 imparts a first differential phase shift to the linear components of a CP signal propagating through the horn. The first transition section 1212 fares into a second transition section 1214 in which a differential phase shift device 1216 imparts a second differential phase shift to the linear components of the CP signal propagating through the horn. In this example, the differential phase shift device 1216 is a pair of opposing stair-step ridges on the interior surface of the waveguide in the second transition section 1214. The first transition section 1212 together with the dielectric tuning vane 1213 imparts a differential phase shift of 30° on the linear components of the signal and the second transition section 1214 imparts a differential phase shift of 60° for a net differential phase shift of 90° as the signal propagates from the reception end 1217 to the output aperture 1218. The net 90° differential phase shift polarizes the CP signal by aligning the orthogonal linear components of the CP signal at the output aperture 1218 of the horn. This example demonstrates an additive differential phase shift protocol in which the direction of the differential phase shift imparted by the first transition section 1212 (e.g., clockwise indicated by a positive sign) is the same as the direction of the differential phase shift imparted by the second transition section 1214. The additive differential phase shift of the transition sections may be useful to accommodate relatively short horns in which there is limited space to complete the 90° differential phase shift required to polarize the CP signal received at the reception end 1217 of the antenna by the time it reaches the output aperture 1218.

Figure 12C:
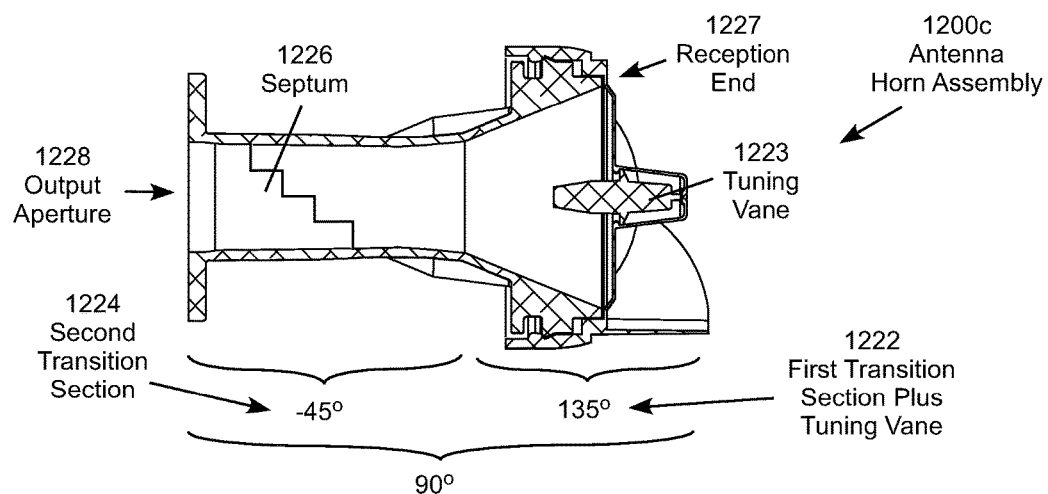
FIG. 12C is a section view of a third alternative embodiment of single-horn antenna horn assembly with a suspended dielectric tuning vane with a septum type phase adjustment device.

FIG. 12C shows a third alternative embodiment of an antenna horn assembly 1200c designed to impart a third differential phase shift protocol, which includes a first transition section 1222 in which an oblong waveguide together with a suspended dielectric tuning vane 1223 imparts a first differential phase shift to the linear components of a CP signal propagating through the horn. The first transition section 1222 fares into a second transition section 1224 in which a differential phase shift device 1226 imparts a second differential phase shift to the linear components of the CP signal propagating through the horn. In this example, the differential phase shift device 1226 is a stair-step septum across the interior surface of the waveguide in the second transition section 1224. The first transition section 1222 together with the dielectric tuning vane 1223 imparts a differential phase shift of 130° on the linear components of the signal and the second transition section 1214 imparts a differential phase shift of −45° for a net differential phase shift of 90° as a CP signal received at the reception end 1227 propagates to the output aperture 1228. The net 90° differential phase shift polarizes the CP signal by differentially phase shifting the orthogonal linear components of the CP signal received at the reception end 1227, so that the linear components are aligned by the time they reach the output aperture 1228 of the horn. This example demonstrates a subtractive differential phase shift protocol in which the direction of the differential phase shift imparted by the first transition section 1222 (e.g., clockwise indicated by a positive sign) is opposite to the direction of the differential phase shift imparted by the second transition section 1224 (e.g., counter-clockwise indicated by a negative sign).

Figure 12D:
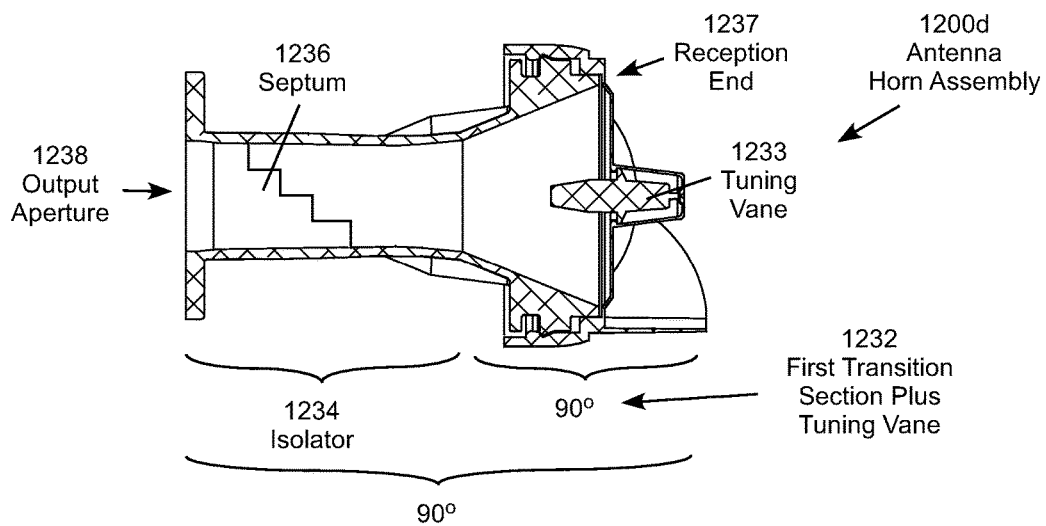
FIG. 12D is a section view of a fourth alternative embodiment of single-horn antenna horn assembly with a suspended dielectric tuning vane with a septum type phase adjustment device.

FIG. 12D shows a third alternative embodiment of an antenna horn assembly 1200d designed to impart a third differential phase shift protocol, which includes a first transition section 1232 in which an oblong waveguide together with a suspended dielectric tuning vane 1233 imparts a 90° differential phase shift to the linear components of a CP signal propagating through the horn to polarize the CP signal by the time it reaches the rear of the first transition section 1232. The first transition section 1232 fares into an isolator 1234 that includes a stair-step septum across the interior surface of the waveguide. The signal isolator 1234 separates two different CP signals for pickup at the output aperture 1238. For example, a first CP signal with a first polarization (e.g., LHP) incident at the reception end 1237 is converted (polarized) to a linear polarity (LP) resultant signal at a −45° angle at the output aperture 1238. Similarly, a second CP signal with a second polarization (e.g., RHP) incident at the reception end 1237 is converted (polarized) to a second linear polarity (LP) resultant signal at a +45° angle at the output aperture 1238. These LP resultant signals corresponding to the LHP and RHP incident signals are at 90° to each other, and at 45° angles with respect to the septum 1236 of the isolator 1234, which isolates and delivers each LP resultant signal to a respective port at the output aperture 1238.

Figure 13A:
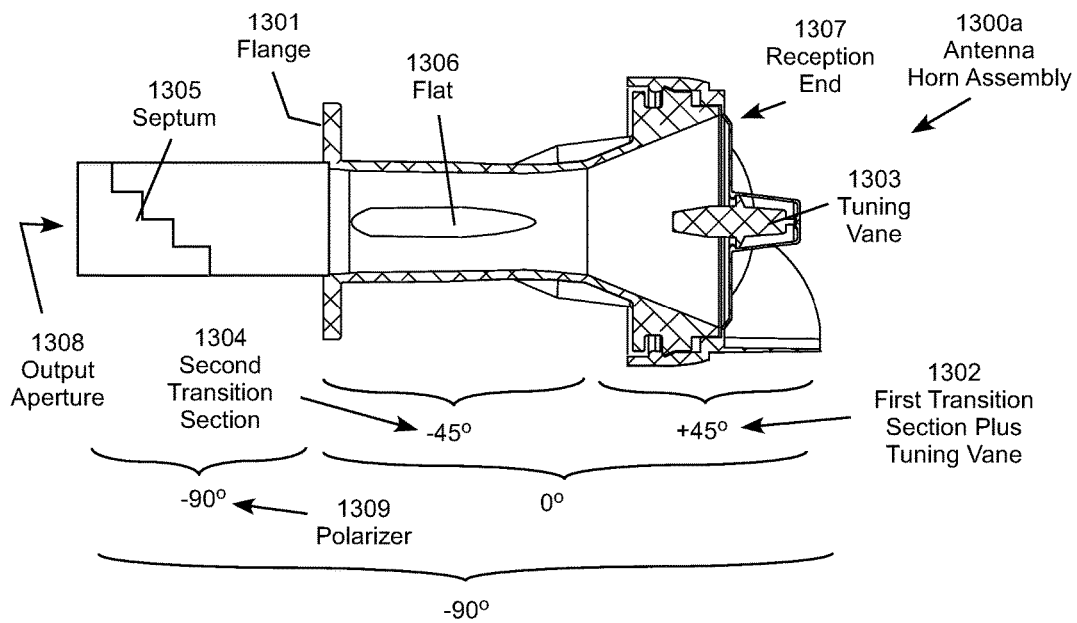
FIG. 13A is a section view of a first single-horn antenna horn assembly with a suspended dielectric tuning vane with an attached polarizer configured for a first differential phase shift protocol.

It should also be appreciated that the net differential phase shift of the protocol is a design parameter that need not be 90°. There may be instances in which desired net phase shift is some other figure. For example, in some configurations the desired differential phase shift may be net zero, in which case the horn may be attached to a conventional 90° polarizer. To provide a first alternative embodiment for this example design, FIG. 13A is a section view of a first single-horn antenna horn assembly 1300a with a suspended dielectric tuning vane 1303 and an attached polarizer 1309 configured for a first differential phase shift protocol. This example includes a first transition section 1302 that includes an oblong waveguide section that, together with the dielectric tuning vane 1303, imparts a first differential phase shift of 45°. A second transition section 1304 includes differential phase shifting device 1306 that imparts a second differential phase shift of −45° offsetting the first differential phase shift for a net differential phase shift of zero between the reception end 1307 and the flange 1301. A conventional polarizer 1309 connected behind the flange 1301 then imparts a 90° differential phase shift to polarize the signal between the flange 1301 and the output aperture 1308. In this example, the differential phase shifting device 1306 is an opposing pair of flat sections on the inner surface of the waveguide in the second transition section 1304. The polarizer 1309 utilizes a stair-step septum 1315. The subtractive differential phase shift protocol of the transition sections has the beneficial effect of flattening the gain (response curve) of the horn across the operational bandwidth.

Figure 13B:
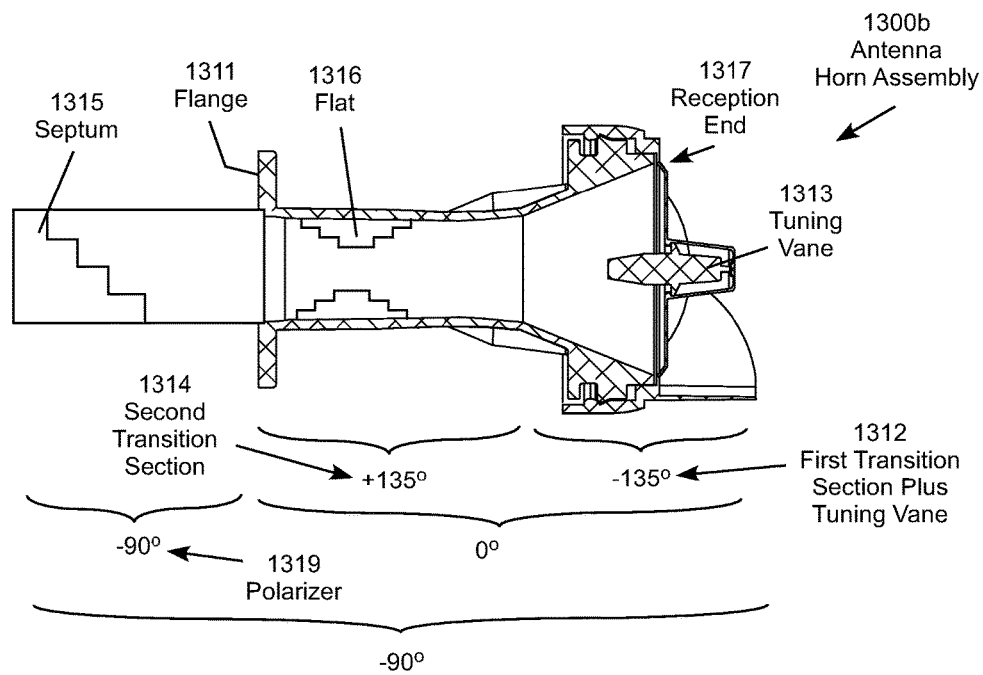
FIG. 13B is a section view of a second single-horn antenna horn assembly with a suspended dielectric tuning vane with an attached polarizer configured for a second differential phase shift protocol.

FIG. 13B is a section view of a second single-horn antenna horn assembly 1300b with a suspended dielectric tuning vane 1313 and an attached polarizer 1319 configured for a second differential phase shift protocol. This example includes a first transition section 1312 that includes an oblong waveguide section that, together with the dielectric tuning vane 1313, imparts a first differential phase shift of −135°. A second transition section 1314 includes differential phase shifting device 1316 that imparts a second differential phase shift of +135° offsetting the first differential phase shift for a net differential phase shift of zero between the reception end 1317 and the flange 1311. A conventional polarizer 1319 connected behind the flange 1311 then imparts a 90° differential phase shift to polarize the signal between the flange 1311 and the output aperture 1318. In this example, the differential phase shifting device 1316 is a pair of opposing ridges on the inner surface of the waveguide in the second transition section 1314. The polarizer 1319 utilizes a stair-step septum 1315. The larger subtractive differential phase shift protocol of the transition sections in this example (the larger 135° twist and twist back in FIG. 13B versus the 45° twist and twist back in FIG. 13A) generally has a greater flattening effect on the gain (response curve) of the horn across the operational bandwidth.

Figure 13C:
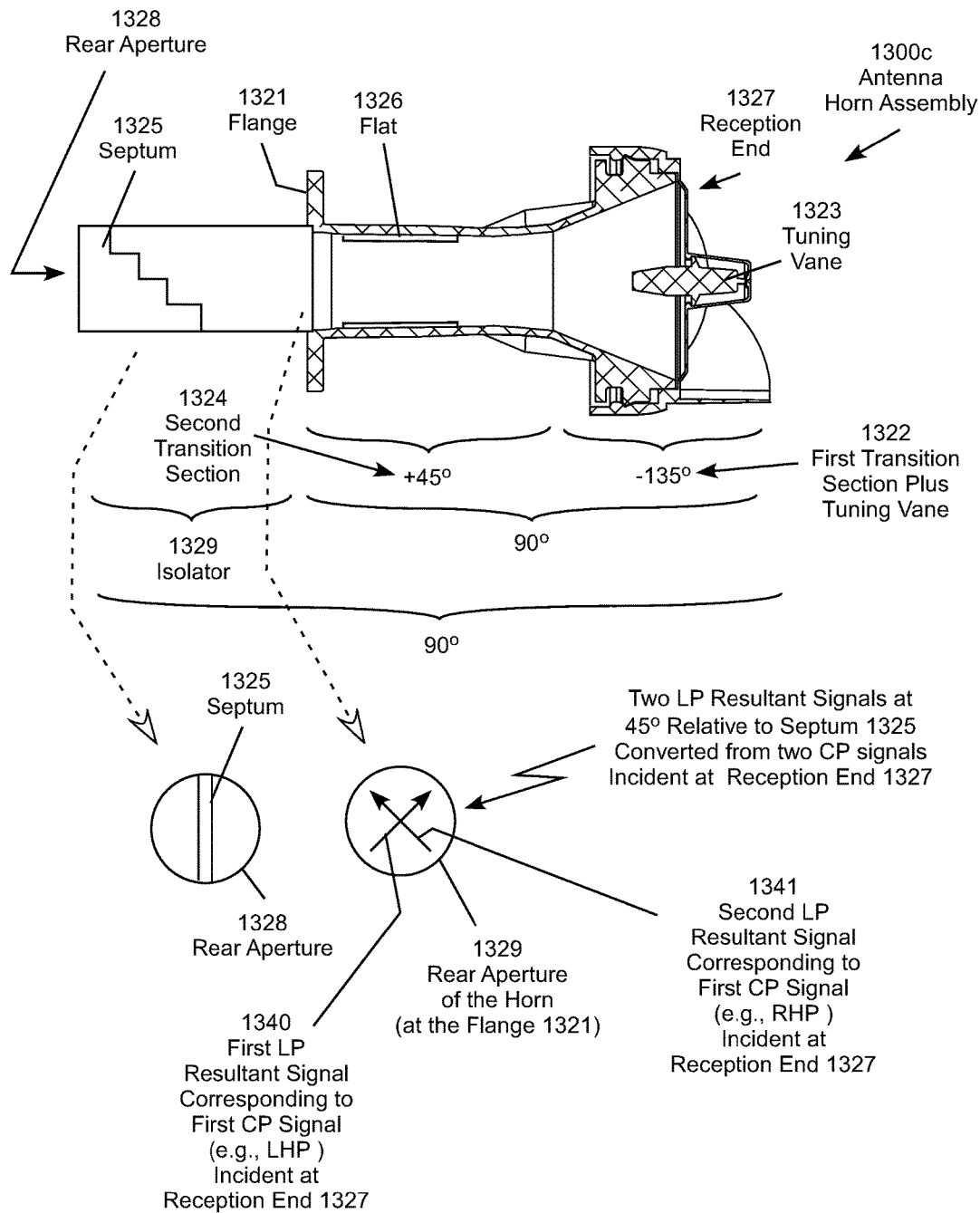
FIG. 13C is a section view of a third single-horn antenna horn assembly with a suspended dielectric tuning vane with an attached polarizer configured for a second differential phase shift protocol.
Figure 15A:
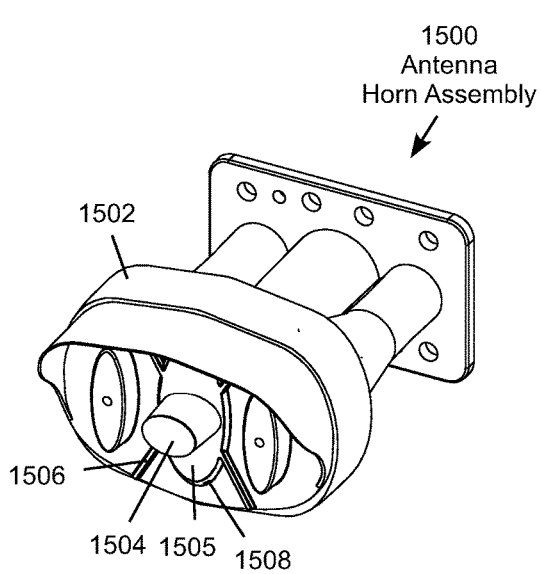
FIGS. 15A-E are various views illustrating a second alternative three-horn antenna horn assembly in which the dielectric tuning vane is built into the lens cap.
Figure 15C:
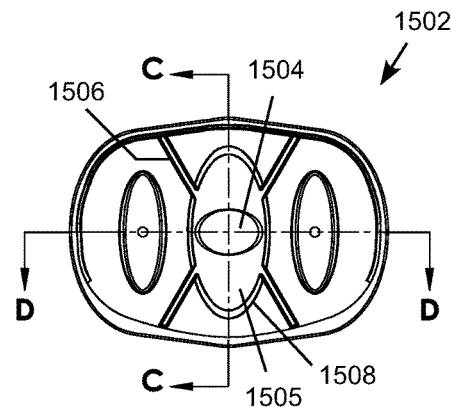
Figure 15D:
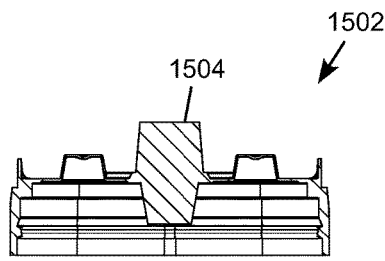
Figure 15B:
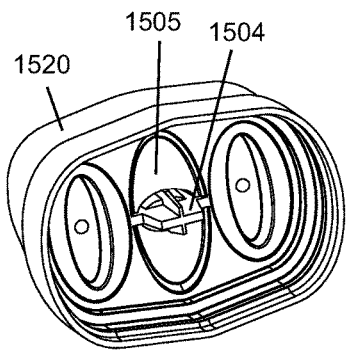
Figure 15E:
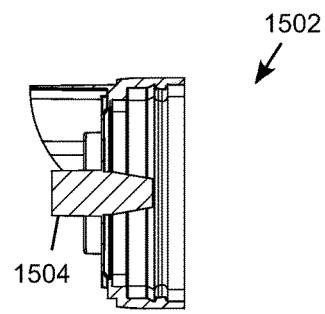
Figure 16A:
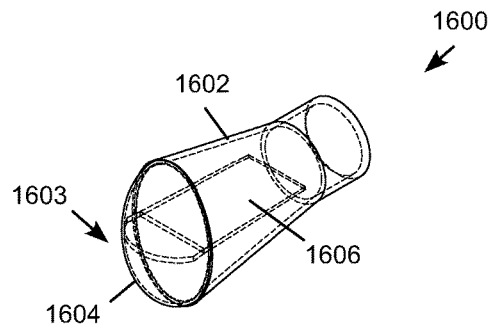
FIGS. 16A-F are various views illustrating a single-horn antenna horn assembly with a dielectric tuning vane built into the lens cap.
Figure 16D:
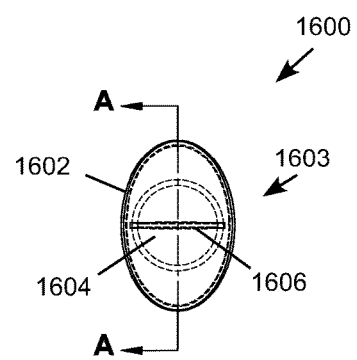
Figure 16B:
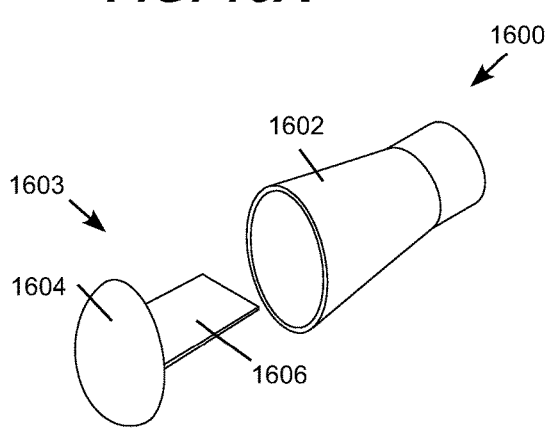
Figure 16E:
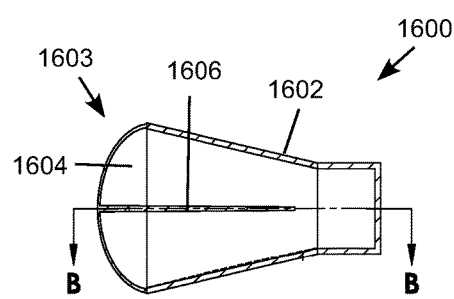
Figure 16C:
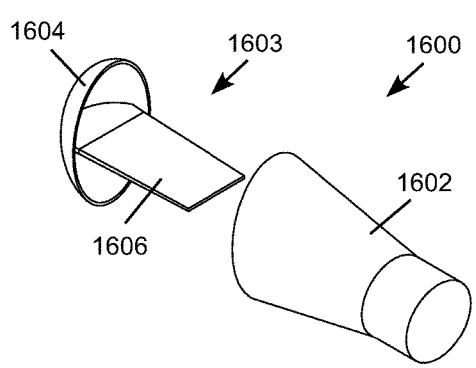
Figure 16F:
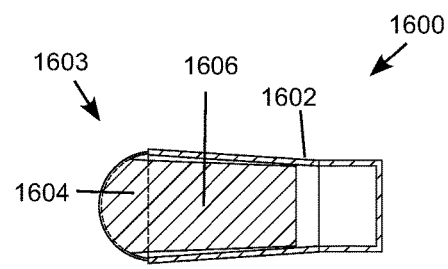
Figure 17A:
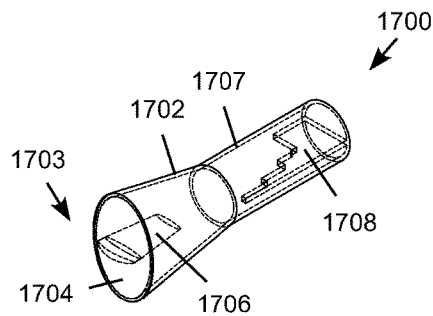
FIGS. 17A-F are various views illustrating an alternative single-horn antenna horn assembly with a dielectric tuning vane built into the lens cap.
Figure 17D:
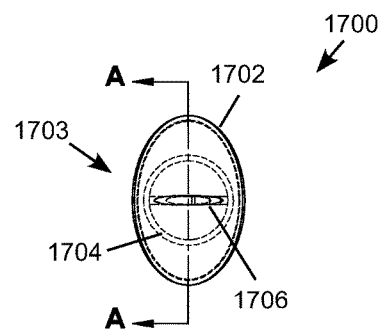
Figure 17B:
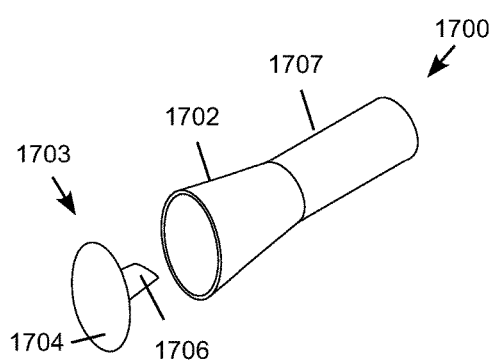
Figure 17E:
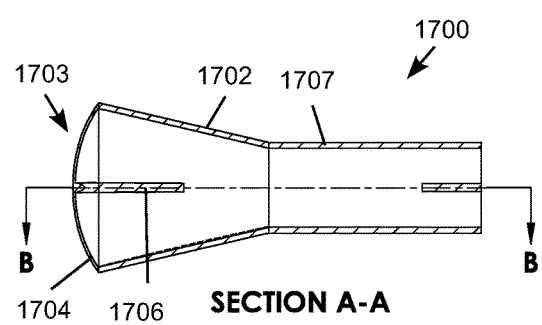
Figure 17C:
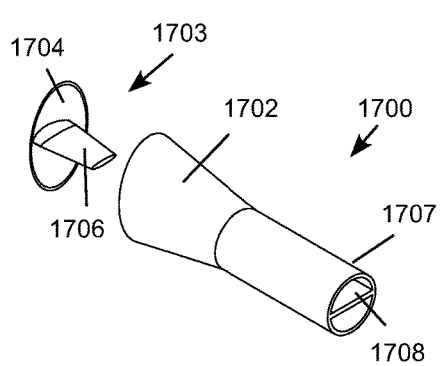
Figure 17F:
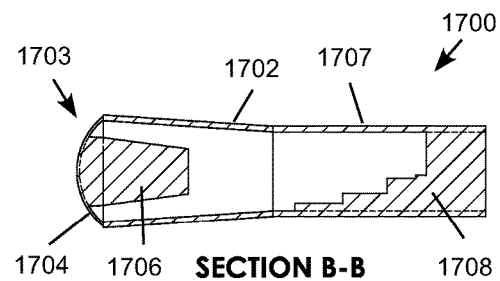

FIG. 13C is a section view of a third single-horn antenna horn assembly 1300c with a suspended dielectric tuning vane 1323 and an attached polarizer 1329 configured for a third differential phase shift protocol. This example includes a first transition section 1322 that includes an oblong waveguide section that, together with the dielectric tuning vane 1323, imparts a first differential phase shift of −135°. A second transition section 1324 includes differential phase shifting device 1326 that imparts a second differential phase shift of +45° offsetting the first differential phase shift for a net differential phase shift of 90° between the reception end 1327 and the flange 1321. In this example, the differential phase shifting device 1326 is a pair of opposing flat sections on the inner surface of the waveguide in the second transition section 1324. The polarizer 1329 utilizes a stair-step septum 1325.

A signal isolator 1329 connected behind the flange 1321 separates two different CP signals for pickup at the rear aperture 1328. For example, a first CP signal with a first polarization (e.g., LHP) incident at the reception end 1327 is converted (polarized) to a linear polarity (LP) resultant signal 1340 at a −45° angle at the flange 1321. Similarly, a second CP signal with a second polarization (e.g., RHP) incident at the reception end 1327 is converted (polarized) to a second linear polarity (LP) resultant signal 1341 at a +45° angle at the flange 1321. These LP resultant signals corresponding to the LHP and RHP incident signals are at 90° to each other, and at 45° angles with respect to the septum 1325 of the isolator 1329, which isolates and delivers each LP resultant signal to a respective port at the rear aperture 1328.

The dielectric tuning vane 20 does not have to be a separate snap in piece. In the alternative designs shown in FIGS. 14A-E and 15A-E, the dielectric tuning vane is directly integrated into the lens cap so that it the lens cap and dielectric tuning vane are a single piece created from one mold.

FIGS. 14A-E are various views illustrating a first alternative three-horn antenna horn assembly 1400 in which the dielectric tuning vane 1404 is built into the lens cap 1402. In this example, the dielectric tuning vane 1404 has an oblong shape including an oblong external portion and an oblong external portion. FIGS. 15A-E are various views illustrating a second alternative three-horn antenna horn assembly 1500 in which the dielectric tuning vane 1504 is built into the lens cap 1502. In this example, the dielectric tuning vane 1504 is connected to a support surface 1505 on the lens cap 1502 by ribs 1506 allowing a space 1508 to separate the support surface 1505 from the remainder of the lens cap 1502. This limits the amount of connection surface between the dielectric tuning vane 1504 and the lens cap 1502 to minimize signal distortion on the dielectric tuning vane 1504 from wetting of the lens cap 1502.

This alternative configuration exhibits the benefits described above but is generally more susceptible to wetting loss degradation because a greater area of relatively thick dielectric is directly exposed to the weather, such as rain, snow and ice. When the outer surface of the lens becomes wet, several key performance parameters (match, directivity, gain, dissipative loss, and X-pol discrimination) can be degraded. Performance degradation expressed by these parameters may be substantially worse when the additional dielectric is molded into the lens, and exposed to the weather elements, versus the snap-in configurations where the dielectric tuning vane is located under a dielectric tuning vane cover portion of the lens cap. In the snap-in embodiments, performance is further improved by using snap-in prongs to minimize the areas of direct contact so that substantial air space is maintained between large portions of the lens cap and the snap-in dielectric turning vane. In the triple-feed horn embodiment, the lens cap with a built-in dielectric tuning vane may also be more difficult to mold because it becomes relatively thick near the center of the 101° center feed horn 14b but remains relatively thin elsewhere. In particular, the lens cap 15 is comparatively thin in front of the higher frequency 99° and 103° outer feed horns 14a and 14c in order to minimize performance degradations of the 99° and 103° feed horns. This can be a challenge in molding production because it is more difficult to mold parts that vary greatly in wall thickness.

FIGS. 16A-F are various views illustrating a single-horn antenna horn assembly 1600. The antenna horn assembly 1600 includes a horn 1602 with an oblong waveguide section and a lens cap assembly 1603 that includes an oblong end cap 1604 supporting a dielectric tuning vane 1606 built into the lens cap assembly. In an alternative configuration, the dielectric tuning vane may snap or have an interference fit into the throat of the antenna horn. The antenna horn assembly 1600 is configured to polarize a CP signal as described previously for the center horn of the three-horn block described with reference to FIGS. 1-11.

FIGS. 17A-F are various views illustrating an alternative single-horn antenna horn assembly 1700. The antenna horn assembly 1700 includes a first differential phase shift section 1702, in this example an oblong waveguide section. A lens cap assembly 1703 includes an oblong end cap 1704 supporting a dielectric tuning vane 1706 built into the lens cap assembly. In an alternative configuration, the dielectric tuning vane may snap or have an interference fit into the throat of the antenna horn. A second differential phase shift section 1707 is fared into the oblong phase adjustment section 1702. The second differential phase shift section 1707 includes a circular waveguide section with a differential phase shift device 1708, in this example a stair-step septum. Again, the antenna horn assembly 1700 is configured to polarize a CP signal as described previously for the center horn of the three-horn block described with reference to FIGS. 1-11.

FIGS. 18A-D are various views illustrating various alignment alternatives between the dielectric tuning vane, the major axis of the oblong antenna horn, and a differential phase shifting device (in these examples a septum) for the single-horn antenna horn assembly. In general, an oblong dielectric tuning vane aligned parallel with the septum impart additive differential phase shifts, whereas a dielectric tuning vane aligned transverse with the septum impart subtractive differential phase shifts. In addition, a dielectric tuning vane aligned parallel to the major axis of the oblong horn narrows the reception pattern in the direction parallel to the major axis of the oblong horn by increasing the effective signal path in the direction parallel to the major axis of the oblong horn. Similarly, a dielectric tuning vane aligned transverse to the major axis of the oblong horn narrows the reception pattern in the direction transverse to the major axis of the oblong horn by increasing the effective signal path in the direction transverse to the major axis of the oblong horn. These techniques can therefore be used to design horns and dielectric tuning vanes to impart a range of different characteristics to participate in a range of differential phase shift protocols.

Figure 18A:
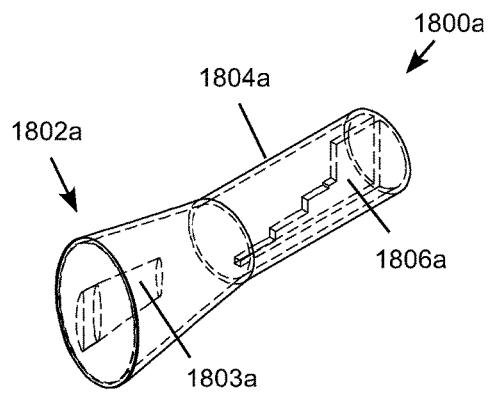
FIGS. 18A-D are various views illustrating various alignment alternatives between the dielectric tuning vane, the major axis of the antenna horn, and a septum for the single-horn antenna horn assembly.

For example, FIG. 18A shows a first illustrative horn antenna 1800a with an oblong waveguide section 1802a and a dielectric tuning vane 1803a. The oblong waveguide section 1802a is fared into a circular waveguide section 1804a with a stair-step septum 1804a. In this example, the dielectric tuning vane 1803a is aligned with the major axis of the oblong waveguide section 1802a, while the stair-step septum 1804a is also aligned with the major axis of the oblong waveguide section.

Figure 18C:
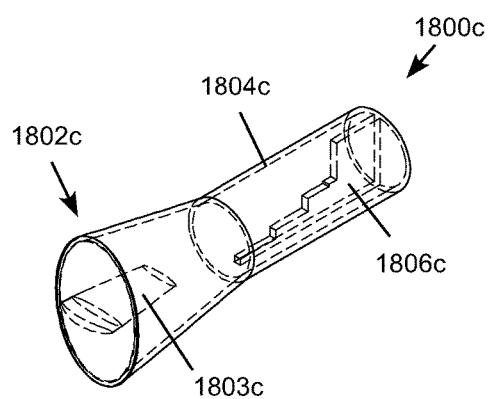
Figure 18B:
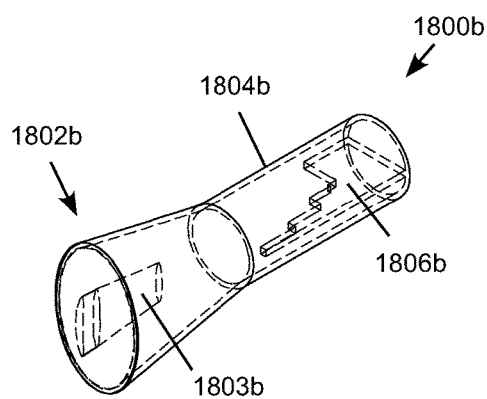

FIG. 18B shows a second illustrative horn antenna 1800b with an oblong waveguide section 1802b and a dielectric tuning vane 1803b. The oblong waveguide section 1802b is fared into a circular waveguide section 1804b with a stair-step septum 1804b. In this example, the dielectric tuning vane 1803b is aligned with the major axis of the oblong waveguide section 1802b, while the stair-step septum 1804b is aligned transverse to the major axis of the oblong waveguide section.

FIG. 18C shows a third illustrative horn antenna 1800c with an oblong waveguide section 1802c and a dielectric tuning vane 1803c. The oblong waveguide section 1802c is fared into a circular waveguide section 1804c with a stair-step septum 1804c. In this example, the dielectric tuning vane 1803c is aligned transverse to the major axis of the oblong waveguide section 1802c, while the stair-step septum 1804c is aligned with the major axis of the oblong waveguide section.

Figure 18D:
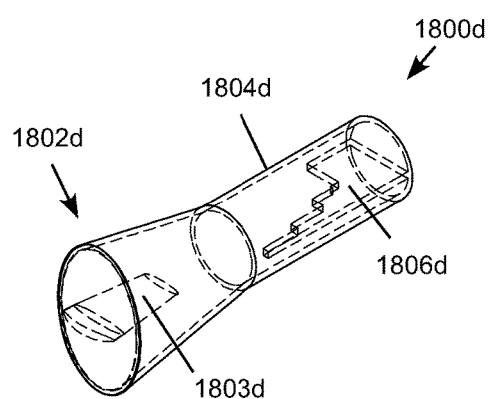

FIG. 18D shows a fourth illustrative horn antenna 1800d with an oblong waveguide section 1802d and a dielectric tuning vane 1803d. The oblong waveguide section 1802d is fared into a circular waveguide section 1804d with a stair-step septum 1804d. In this example, the dielectric tuning vane 1803d is aligned transverse to the major axis of the oblong waveguide section 1802d, while the stair-step septum 1804d is also aligned transverse to the major axis of the oblong waveguide section.

Figure 19:
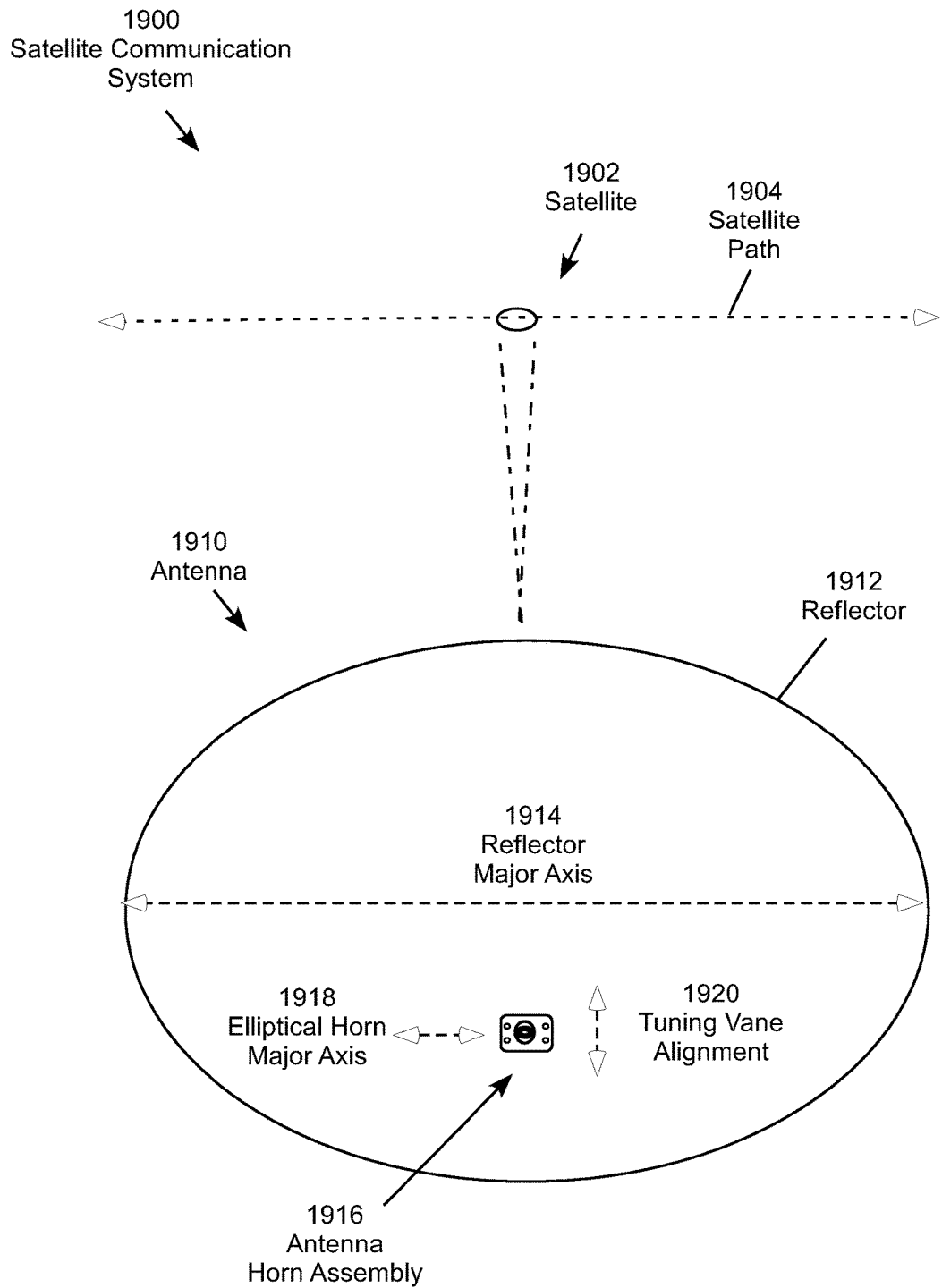
FIG. 19 is a conceptual illustration of a satellite communication system including a satellite communicating with a reflector antenna including a single-horn antenna horn assembly with a suspended dielectric tuning vane.

FIG. 19 is a conceptual illustration of a satellite communication system 1900 including a satellite 1902 communicating with a reflector antenna 1910 including a single-horn antenna assembly 1916 that includes a suspended dielectric tuning vane. The satellite 1902 appears stationary from the antenna 1910 located on the surface of the Earth as it travels on a geostationary satellite orbit path 1904. The antenna 1910 includes an oblong (typically, but not necessarily, elliptical) reflector 1912 having a major axis 1914 that is typically installed so that the major axis 1914 is aligned with satellite orbit path 1904. The single-horn antenna horn assembly 1916 is positioned approximately at the focal point of the reflector (shown slightly below center in FIG. 19 for illustrative clarity). In this configuration, the major axis of the oblong antenna horn has an alignment 1918 aligned with the major axis of the reflector 1914, while the dielectric tuning vane has an alignment 1920 transverse to the major axis 1914 of the of the reflector 1112. This narrows the reception pattern of the antenna horn transverse to the major axis of the reflector allowing the illumination shape of the horn to match the shape of the reflector while reducing the required height of the reflector transverse to the major axis.

The invention claimed is:

1. An antenna horn assembly for a satellite communication system defining a signal propagation direction and a transverse direction orthogonal to the signal propagation direction, comprising:
    an antenna horn extending in the signal propagation direction between a reception aperture to an output aperture comprising one or more differential phase shifting devices configured to differentially phase shift linear components of a circular polarity (CP) signal as the CP signal travels from the reception aperture to the output aperture;
    a dielectric tuning vane suspended in a reception zone of the antenna horn configured to differentially phase shift the linear components of the CP signal as the CP signal travels past the dielectric tuning vane;
    wherein the antenna horn and the dielectric tuning vane are configured to impart a desired differential phase shifting protocol as the CP signal travels from the reception aperture to an output aperture.

2. The antenna horn assembly of claim 1, wherein the dielectric tuning vane comprises an oblong shape in the transverse direction.

3. The antenna horn assembly of claim 1, wherein the dielectric tuning vane passes through the reception aperture and comprises an exterior portion positioned outside the reception aperture in the signal propagation direction, and an interior portion positioned inside the reception aperture in the signal propagation direction.

4. The antenna horn assembly of claim 1, further comprising a lens cap attached to the antenna horn adjacent to the reception aperture, wherein the dielectric tuning vane is configured to snap into the lens cap.

5. The antenna horn assembly of claim 1, further comprising a lens cap attached to the antenna horn adjacent to the reception aperture, wherein the dielectric tuning vane is integrally built into the lens cap.

6. The antenna horn assembly of claim 1, wherein the antenna horn is the center horn of a three-horn block, the antenna further comprises a single reflector for the horns of the three-horn block, and the dielectric tuning vane is configured to improve isolation of the center horn from other horns of the block.

7. The antenna horn assembly of claim 6, wherein the three-horn block is configured to exchange signals with three satellites positioned within a viewing angle of approximately four degrees.

8. The antenna horn assembly of claim 1, wherein the protocol comprises additive differential phase shifts imparted by the dielectric tuning vane and the differential phase shifting devices resulting in polarization of the CP signal.

9. The antenna horn assembly of claim 1, wherein the protocol comprises subtractive differential phase shifts imparted by the dielectric tuning vane and the differential phase shifting devices resulting in polarization of the CP signal.

10. The antenna horn assembly of claim 1, wherein the protocol comprises subtractive differential phase shifts imparted by the dielectric tuning vane and the differential phase shifting devices resulting in net zero differential phase shift imparted to the CP signal.

11. The antenna horn assembly of claim 1, wherein the differential phase shifting device comprises a waveguide section having an oblong shape in the transverse direction.

12. The antenna horn assembly of claim 1, wherein:
wherein the differential phase shifting device comprises a waveguide section having an oblong shape in the transverse direction;
further comprising a second a second differential phase shifting device selected from the group consisting of:
an opposing pair of flat sections on an inner surface of a waveguide section;
an opposing pair of ridges on an inner surface of a waveguide section;
a septum extending across a waveguide section.

13. An antenna comprising:
a reflector;
an antenna horn assembly defining a signal propagation direction and a transverse direction orthogonal to the signal propagation direction, the antenna horn extending in the signal propagation direction between a reception aperture to an output aperture comprising one or more differential phase shifting devices configured to differentially phase shift linear components of a circular polarity (CP) signal as the CP signal travels from the reception aperture to the output aperture;
a dielectric tuning vane suspended in a reception zone of the antenna horn configured to differentially phase shift the linear components of the CP signal as the CP signal travels past the dielectric tuning vane;
wherein the antenna horn and the dielectric tuning vane are configured to impart a desired differential phase shifting protocol as the CP signal travels from the reception aperture to an output aperture.

14. The antenna of claim 13, further comprising a lens cap attached to the antenna horn adjacent to the reception aperture, wherein the dielectric tuning vane is configured to snap into the lens cap.

15. The antenna of claim 13, further comprising a lens cap attached to the antenna horn adjacent to the reception aperture, wherein the dielectric tuning vane is integrally built into the lens cap.

16. The antenna of claim 13, wherein the three-horn block is configured to exchange signals with three satellites positioned within a viewing angle of approximately four degrees, and the dielectric tuning vane is configured to improve isolation of the center horn from other horns of the block.

17. A satellite communication system, comprising:
three closely spaced satellites aligned on a geostationary orbital path;
an antenna comprising:
a reflector;
an antenna horn assembly comprising three horn antennas in a three-horn block, wherein each antenna is configured to exchange signals with a respective one of the satellites via the reflector;
the three-horn block comprising a center antenna horn defining a signal propagation direction and a transverse direction orthogonal to the signal propagation direction, the antenna horn extending in the signal propagation direction between a reception aperture to an output aperture comprising one or more differential phase shifting devices configured to differentially phase shift linear components of a circular polarity (CP) signal as the CP signal travels from the reception aperture to the output aperture;
a dielectric tuning vane suspended in a reception zone of the center antenna horn configured to differentially phase shift the linear components of the CP signal as the CP signal travels past the dielectric tuning vane;
wherein the center antenna horn and the dielectric tuning vane are configured to impart a desired differential phase shifting protocol as the CP signal travels from the reception aperture to an output aperture; and
the dielectric tuning vane is configured to improve isolation of the center horn from other horns of the block.

18. The satellite communication system of claim 17, wherein the protocol comprises additive differential phase shifts imparted by the dielectric tuning vane and the differential phase shifting devices resulting in polarization of the CP signal.

19. The satellite communication system of claim 17, wherein the protocol comprises subtractive differential phase shifts imparted by the dielectric tuning vane and the differential phase shifting devices resulting in polarization of the CP signal.

20. The satellite communication system of claim 17, wherein:
the reflector has a major axis aligned with the geostationary orbital path;
the antenna horn has an oblong reception aperture with a major axis aligned transverse to the signal propagation direction; and
the dielectric tuning vane is aligned parallel to the major axis of the reflector.

* * * * *